(12) United States Patent
Doddaiah et al.

(10) Patent No.: US 12,197,756 B2
(45) Date of Patent: Jan. 14, 2025

(54) SYSTEM AND METHOD FOR MINIMIZING CO2 EMISSIONS DUE TO UTILIZATION OF ALLOCATED DATA CENTER MEMORY RESOURCES FOR STORAGE OF FINGERPRINT HASH TABLES

(71) Applicant: Dell Products, LP, Round Rock, TX (US)

(72) Inventors: Ramesh Doddaiah, West Borough, MA (US); Deeder M. Aurongzeb, Austin, TX (US); Malathi Ramakrishnan, Tamil Nadu (IN)

(73) Assignee: DELL PRODUCTS LP, Round Rock, TX (US)

( * ) Notice: Subject to any disclaimer, the term of this patent is extended or adjusted under 35 U.S.C. 154(b) by 54 days.

(21) Appl. No.: 18/196,180

(22) Filed: May 11, 2023

(65) Prior Publication Data
US 2024/0377977 A1 Nov. 14, 2024

(51) Int. Cl.
*G06F 3/06* (2006.01)

(52) U.S. Cl.
CPC .......... *G06F 3/0641* (2013.01); *G06F 3/0626* (2013.01); *G06F 3/0656* (2013.01); *G06F 3/0679* (2013.01)

(58) Field of Classification Search
CPC .... G06F 3/0641; G06F 3/0626; G06F 3/0656; G06F 3/0679
See application file for complete search history.

(56) References Cited

U.S. PATENT DOCUMENTS

| 8,185,909 B2 | 5/2012 | Sigal |
| 8,626,450 B2 | 1/2014 | Dooley |
| 9,183,327 B2 | 11/2015 | Keeli |

(Continued)

FOREIGN PATENT DOCUMENTS

| EP | 2006770 B1 | 1/2014 |
| WO | 2011/106160 A2 | 9/2011 |

OTHER PUBLICATIONS

C. Herrmann, et al., "Sustainability as Strategic Business Model for Profitable Business," 7 pages, May 2014.

(Continued)

*Primary Examiner* — Tasnima Matin
(74) *Attorney, Agent, or Firm* — Prol Intellectual Property Law, PLLC; H. Kenneth Prol

(57) ABSTRACT

An information handling system executing a predictive hash table and carbon dioxide (CO2) minimizing system may comprise a network interface device to receive from a remote data center deduplication process workload metrics, fingerprint hash table size metrics, and a current reserved memory size allocated for storage of a fingerprint hash table, a processor executing code instructions to predict a future workload of deduplication processes and a future fingerprint hash table size to determine a predicted amount of memory to reserve for storage of a future fingerprint hash table based on the predicted future workload of deduplication processes and fingerprint hash table size, and to determine an over-allocated portion of the current reserved memory size where the network interface device transmits an instruction to the data center to limit power provided to the over-allocated portion of the current reserved memory size.

20 Claims, 5 Drawing Sheets

(56) References Cited

U.S. PATENT DOCUMENTS

| | | | |
|---|---|---|---|
| 9,760,474 B2 | 9/2017 | Pillai | |
| 11,409,667 B1 | 8/2022 | Ippatapu | |
| 11,860,996 B1* | 1/2024 | Pizlo | ............... G06F 8/434 |
| 2004/0024861 A1 | 2/2004 | Coughlin | |
| 2008/0046895 A1 | 2/2008 | Dillenberger | |
| 2009/0276388 A1 | 11/2009 | Donohue | |
| 2009/0292617 A1 | 11/2009 | Sperling | |
| 2010/0070404 A1 | 3/2010 | McConnell | |
| 2014/0100937 A1 | 4/2014 | Na | |
| 2014/0181834 A1 | 6/2014 | Lim | |
| 2014/0316964 A1 | 10/2014 | Slutsker | |
| 2015/0324255 A1* | 11/2015 | Kochunni | ............ G06F 3/0626 |
| | | | 711/162 |
| 2017/0123857 A1 | 5/2017 | Khan | |
| 2018/0210659 A1* | 7/2018 | Malladi | ............... G06F 12/023 |
| 2018/0217777 A1* | 8/2018 | Jiang | ................. G06F 3/0608 |
| 2021/0004328 A1 | 1/2021 | Wang | |
| 2023/0385066 A1* | 11/2023 | Bouzguarrou | ........ G06F 9/3848 |

OTHER PUBLICATIONS

A. Stenhall, "What is the carbon footprint of a typical corporate laptop?," 6 pages, Oct. 25, 2020.

K. Abnett, et al., "EU proposes world's first carbon border tax for some imports," 14 pages, Jul. 14, 2021.

* cited by examiner

SYSTEM AND METHOD FOR MINIMIZING CO2 EMISSIONS DUE TO UTILIZATION OF ALLOCATED DATA CENTER MEMORY RESOURCES FOR STORAGE OF FINGERPRINT HASH TABLES

FIELD OF THE DISCLOSURE

The present disclosure generally relates to minimizing an amount of greenhouse gas emissions that may be attributable to operation of a data storage system or data center. More specifically, the present disclosure relates to a predictive hash table and carbon dioxide (CO2) minimizing system for determining an optimal amount of memory to reserve or allocate for storage of a fingerprint hash table used for deduplication based on previous sizes of fingerprint hash tables and previous deduplication workload metrics, to minimize CO2 emissions due to power consumption by over-allocated memory resources for storage of fingerprint hash tables.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, data centers, and networking systems. The information handling system may include telecommunication, network communication, video communication capabilities, and audio capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
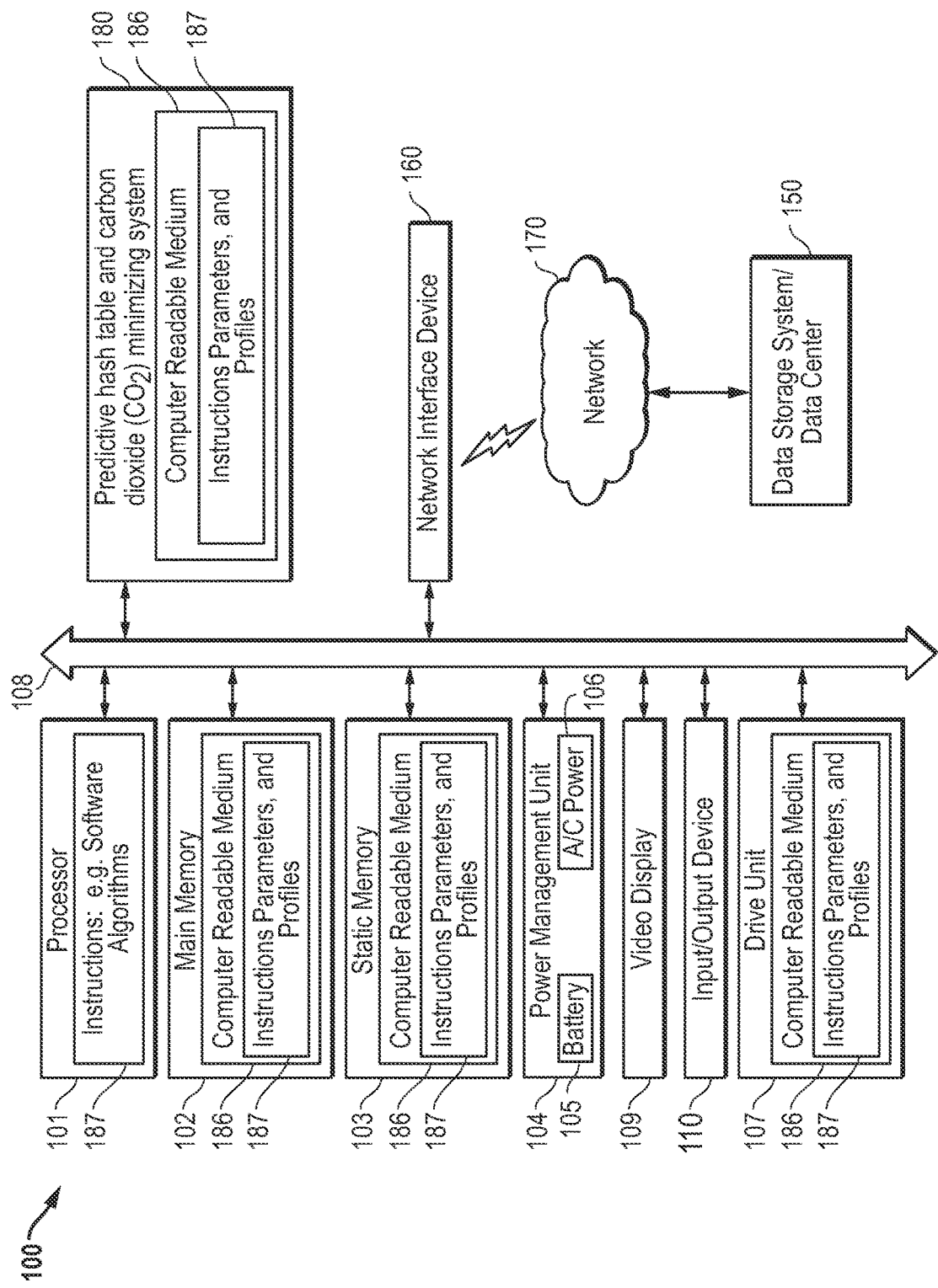
FIG. 1 is a block diagram illustrating a cloud-based Unified Endpoint Management (UEM) platform information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Consumers are placing an ever increasing value on minimizing greenhouse gas (GHG) emissions generated during manufacture and usage of products they purchase. In other words, the size of GHG emissions generated during manufacture or use of a product is projected to sway an end consumer's purchasing decision to an increasingly large degree over the coming years. Further, such emissions may also influence a cloud computing customer's selection of cloud-based computing resources, including servers or other hardware components operated within one or more data centers for a larger enterprise system. GHGs emitted by any hardware component of a data center (e.g., computing node, storage engine, data storage array, managed drives) within an enterprise network may be dependent upon power consumed during operation of the various hardware components. For example, various hardware components may cause the emission of GHGs by consuming power delivered to memory hardware used to store enterprise-wide data records (e.g., e-mails for multiple employees, accounting records, client/customer contact information, just to name a few), as well as various system-level records (e.g., fingerprint hash tables mapping methods of deduplicating data records, various libraries, policies, and load-balancing command instructions) used in the management of such stored data records. One way to minimize such GHG emissions is to power down or turn off any memory hardware not currently in use, or not predicted to be needed during a given future time window. The predictive hash table and carbon dioxide (CO2) minimizing system in embodiments of the present disclosure predicts an optimal amount of memory to reserve for storage of one or more fingerprint hash tables at a data center for use in deduplication of stored data records in order to decrease power consumed and GHG otherwise that would be emitted due to over-allocation of memory resources for storage of such fingerprint hash tables as in current systems.

Because many of the data records stored at a data center may be duplicative of one another (e.g., an e-mail sent to ten employees may result in ten different copies of the same e-mail, as retrieved from the individual accounts of each of the ten employees), enterprises often use a deduplication method to store only one of these duplicative records within each data pool. In order to enable retrieval of the single stored copy of these duplicative records by each of the user accounts from which the data pool may have received a duplicative record, the enterprise may track or map the deduplicated or deleted data record to the single stored copy. In other words, the enterprise may generate a fingerprint hash table that identifies the deleted, duplicative data record and points to the location of the stored single copy of the deleted and duplicative data record. In such a way, the enterprise system may retrieve the single copy of the deleted and duplicative data record when requested to retrieve the deleted and duplicative data record by referencing such a table. In various embodiments described herein, such a table may be referred to as a fingerprint hash table.

In existing systems, a static amount of memory may be reserved specifically for storage of these fingerprint hash tables. For example, the amount of memory within each information handling system (e.g., server) reserved for storage of such hash tables in existing systems may be prescribed by a Simple Operating System (SOS) Volume Table of Contents (VTOC), based on an available amount of memory accessible at that information handling system. Because such a default reservation of memory depends on the amount of memory available, rather than upon the amount of memory likely to be actually used by such a hash table, the default reservation (e.g., by SOS VTOC) may result in over or under reservation of memory resources. In other words, the hash table generated through deduplication methods such as that described above may require more or less memory than that reserved for storage of the hash table by default means. In many cases, usage of the default method results in reservation of more memory resources than necessary for storage of the hash table. All memory resources reserved in such a way may be powered on just in case those resources may be used, resulting in powering on of ultimately unused memory resources and generating unnecessary CO2 with that power consumption.

The predictive hash table storage and CO2 minimizing system in embodiments of the present disclosure addresses these issues by using a trained time series forecasting engine to predict an optimal amount of memory to reserve for storage of a future fingerprint hash table, based on a predicted volume of deduplication processes to be executed and a predicted size of the future fingerprint hash table generated, at least partially, as a consequence of those deduplication processes. The time series forecasting engine in embodiments of the present disclosure may be trained to predict a future volume of deduplication processes based on deduplication metrics previously received over a number of previous time windows in a training period. The time series forecasting engine in embodiments of the present disclosure may also be trained to predict a future size of a fingerprint hash table based on fingerprint hash table size metrics previously received over a number of previous time windows in the training period.

A deduplication engine of the predictive hash table and CO2 minimizing system in embodiments of the present disclosure may determine an optimal amount of memory to reserve for storage of a future fingerprint hash table, based on these predicted future volume of deduplication processes and future fingerprint hash table size, as well as user input restrictions indicating a level of user confidence in the accuracy of these predictions. The data center in embodiments may include a manager terminal at which a user may enter one or more user-specified hash table restriction thresholds via a graphical user interface (GUI) and display. For example, the manager/user of the data center may provide a burst buffer value r that forcibly increases the amount of memory reserved for storage of the hash table above the predicted size of the fingerprint hash table to be generated during an upcoming time window. This may provide some cushion or buffer in case the predicted size is less than the actual size of the fingerprint hash table when it is created. As another example, the manager/user of the data center may provide a forced minimizing values that forcibly caps the amount of memory reserved for storage of the hash table above below the predicted size of the fingerprint hash table in anticipation of a smaller fingerprint hash table to be generated during the upcoming time window in comparison to previously created fingerprint hash tables. As yet another example, the manager/user of the data center may provide a high-encryption rate forced minimizing value that forcibly caps the amount of memory reserved for storage of the hash table below the predicted size of the fingerprint hash table to be generated in anticipation of a high volume of encryption tasks that result in unnecessary entries of hash table values, and thus, unnecessarily larger fingerprint hash tables.

The predictive hash table and CO2 minimizing system in embodiments of the present disclosure may determine an optimal amount of memory to reserve for storage of the fingerprint hash table based, in part, on the forecasted change in volume of deduplication tasks during an upcoming time window. This may assist in reducing power consumed and CO2 generated as a result of powering unused memory. For example, if the deduplication workload is expected to increase, the deduplication engine of the predictive hash table and CO2 minimizing system in embodiments herein may determine a user-influenced increased growth rate for the fingerprint hash table based on the predicted size of the fingerprint hash table, multiplied by the user-defined burst buffer value. The deduplication engine may then determine the optimal amount of memory to reserve for storage of the future fingerprint hash table based on the size of the most recently stored fingerprint hash table and this user-influenced increased growth rate.

As another example, if the deduplication workload is expected to decrease or remain steady, the deduplication engine of the predictive hash table and CO2 minimizing system in embodiments herein may further analyze the predicted size of the fingerprint hash table to determine a potential reason for such stagnation or decline. For example, if the deduplication engine determines the deduplication workload is expected to decrease or remain steady, and the fingerprint hash table is also predicted to decrease in size or remain steady in size, this may indicate that most entries within the hash table will be used in a deduplication process, and are thus necessary for storage within the fingerprint hash table. In contrast, if the deduplication engine determines the deduplication workload is expected to decrease or remain steady while the fingerprint hash table is predicted to increase in size, this may indicate that some number of entries generated within the fingerprint hash table may be in reference to encrypted data records. This may be the case because encrypted data records cannot be deduplicated. Thus, each encrypted data record written to the data center memory may increase the number of hash table values entered into the hash table without increasing the deduplication workload. This may also cause unnecessary or non-useful hash table entries, since those entries cannot be used to deduplicate, thus increasing memory powered on and CO2 generated unnecessarily.

As described directly above, the deduplication engine in some cases may determine the volume of deduplication processes is predicted to remain steady or decrease, and the size of the fingerprint hash table is also predicted to remain steady or decrease. In such a scenario, the deduplication engine may further determine a user-influenced declining growth rate for the fingerprint hash table based on the predicted size of the fingerprint hash table, multiplied by the user-defined forced limiting value. The deduplication engine may then determine the optimal amount of memory to reserve for storage of the future fingerprint hash table based on the size of the most recently stored fingerprint hash table and this user-influenced declining growth rate to limit unnecessary power consumption for unnecessary memory.

The deduplication engine in other cases may determine the volume of deduplication processes is predicted to remain steady or decrease, while the size of the fingerprint hash table is predicted to increase. This may indicate the likelihood of a high volume of encryption tasks in the upcoming time window. In such a scenario, the deduplication engine may further determine a user-influenced encryption-capped growth rate for the fingerprint hash table based on the predicted size of the fingerprint hash table, multiplied by the user-defined high-encryption rate forced limiting value. The deduplication engine may then determine the optimal amount of memory to reserve for storage of the future fingerprint hash table based on the size of the most recently stored fingerprint hash table and this user-influenced encryption-capped growth rate.

Upon determination of an optimal amount of memory to reserve for storage of the future fingerprint hash table by the predictive hash table and CO2 minimizing system in embodiments described herein in various scenarios, the predictive hash table and CO2 minimizing system may transmit this recommended optimal amount of memory to reserve, and an instruction to power down any over-allocated memory resources previously reserved for storage of the fingerprint hash table(s) that exceeds this optimal amount. By instructing powering down such memory resources, the predictive hash table and CO2 minimizing system in embodiments of the present disclosure may tailor the amount of memory reserved for storage of fingerprint hash table(s) to a predicted and user-influenced size of a future-generated fingerprint hash table and decrease unnecessary CO2 emissions generated due to overallocation of memory resources.

FIG. 1 illustrates an information handling system 100 according to several aspects of the present disclosure. As described herein, an information handling system 180 may execute code instructions of a predictive hash table and CO2 minimizing system 180 operating at a Unified Endpoint Management (UEM) platform information handling system to tailor an amount of memory resources reserved for storage of a fingerprint hash table in a future time window to a predicted size of the fingerprint hash table, as adjusted by the user/manager of the remote data storage system/data center 150, so as to minimize CO2 emitted due to powering on of memory resources at the data center (e.g., 150) of the enterprise system. Some or all of portions and components information handling system 100 in FIG. 1 may also represent one or more portions of a data storage system/data center(s) (e.g., computing nodes or storage engines as described in greater detail below with respect to FIG. 2) according to embodiments herein, also shown at as data storage system/data center(s) 150 hardware components, and information handling system 100 may also serve as a UEM platform device, or a data storage system/data center(s) 150 managing the data storage system/data center(s) 150 hardware components, according to various embodiments herein. Data storage system/data center(s) 150 hardware components operational telemetry measurements including deduplication process workload metrics, fingerprint hash table metrics, and user-specified hash table restriction thresholds may be gathered during routine monitoring periods from a plurality of data storage system/data center(s) 150 hardware components, and the data storage system/data center(s) 150 managing such components to the UEM platform 100 executing the predictive hash table and CO2 minimizing system 180.

Some or all of the information handling system 100 of FIG. 1 may operate at a UEM platform information handling system or as a portion of a data storage system/data center(s) according to various embodiments herein. The UEM platform 100 in an embodiment may manage the amount of memory at the data center 150 reserved for storage of fingerprint hash tables used in deduplication processes so as to minimize CO2 emissions due to power consumed by memory resources so reserved and consequently powered on.

Using these operational telemetry measurements from a plurality of data storage system/data center(s) 150 hardware components, and user-defined hash table restriction thresholds, the predictive hash table and CO2 minimizing system 180 executing on a hardware processor 101 in embodiments herein may use a time series forecasting engine to predict a future workload of deduplication processes and a future size of a fingerprint hash table during a future time window. The predictive hash table and CO2 minimizing system 180 may then determine an optimal amount of memory to reserve for storage of a fingerprint hash table to be created during that future time window, based on the predicted future workload of deduplication processes, future size of the fingerprint hash table predicted, and the user-defined hash table restriction thresholds. The predictive hash table and CO2 minimizing system may then transmit an instruction to the data center 150 to power down any memory resources currently reserved for storage of fingerprint hash tables that exceeds this optimal amount of memory determined by the predictive hash table and CO2 minimizing system. In such a way, the predictive hash table and CO2 minimizing system 180 may tailor the amount of memory reserved for storage of fingerprint hash table(s) to a predicted and user-influenced size of a future-generated fingerprint hash table and decrease unnecessary CO2 emissions generated due to overallocation of memory resources.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 186 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware control logic, or any combination thereof. Additional components of the information handling system 100 may include one or more storage devices 103 or 107, a wireless network interface device 160, one or more communications ports for communicating with external devices, as well as various input and output (I/O) devices 110, such as a keyboard, a mouse, touchpad or any combination thereof. A power management unit (PMU) 104 supplying power to the information handling system 100, via a battery 105 or an alternating current (A/C) power adapter 106 may supply power to one or more components of the information handling system 100, including the hardware processor 101, or other hardware processing resources executing code instructions of the predictive hash table and CO2 minimizing system 180, the wireless network interface device 160, a static memory 103 or drive unit 107, a, a video display 109, or other components of an information handling system. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 may execute code instructions 187, via one or more hardware processing resources, such as for the predictive hash table and CO2 minimizing system 180, that may operate on servers or systems, remote data centers, or on-box in individual data storage system/data center(s) 150 according to various embodiments herein. In some embodiments, it is understood any or all portions of code instructions 187 may operate on a plurality of information handling systems 100.

The information handling system 100 may include a hardware processor 101 such as a central processing unit (CPU), a graphics processing unit (GPU), a Visual Processing Unit (VPU), or a hardware accelerator, embedded controllers or hardware control logic or some combination of the same. Such a hardware processor 101 in an embodiment may be referred to herein as a "local" processor, as it is "local" to the UEM platform of which the information handling system 100 may comprise all or a part. Any of the hardware processing resources may operate to execute code that is either firmware or software code. Moreover, the information handling system 100 may include memory such as main memory 102, static memory 103, containing computer readable medium 186 storing instructions 187. In other embodiments the information handling system 100 may represent a server information handling system executing a predictive hash table and CO2 minimizing system 180, operating system (OS) software, application software, BIOS software, or other software applications or drivers detectable by hardware processor type 101.

The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the hardware processor 101. The information handling system 100 may also include one or more buses 108 operable to transmit communications between the various hardware components such as any combination of various input and output (I/O) devices 110, or the like.

The network interface device 160 may provide connectivity of the information handling system 100 to the network 170 via a dedicated link, a network access point (AP) or base station in an embodiment. The network 170 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6e. It is understood that any number of available channels may be available in WLAN under the 2.4 GHZ, 5 GHZ, or 6 GHz bands which may be shared communication frequency bands with WWAN protocols in some embodiments.

The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 160 in an embodiment may transceive within radio frequencies associated with the 5G New Radio (NR) Frequency Range 1 (FR1) or Frequency Range 2 (FR2). NRFR1 may include radio frequencies below 6 GHz, also sometimes associated with 4G LTE and other standards predating the 5G communications standards. NRFR2 may include radio frequencies above 6 GHZ, made available within the emerging 5G communications standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

In some embodiments, hardware executing software or firmware, dedicated hardware implementations such as application specific integrated circuits, programmable logic arrays and other hardware devices may be constructed to implement one or more of some systems and methods described herein. Applications that may include the hardware processing resources executing systems of various embodiments may broadly include a variety of electronic and computer systems. One or more embodiments described herein may implement functions using two or more specific interconnected hardware modules or devices with related control and data signals that may be communicated between and through the hardware modules, or as portions of an application-specific integrated circuit. Accordingly, the present embodiments encompass hardware processing resources executing software or firmware, or hardware implementations.

In accordance with various embodiments of the present disclosure, the methods described herein may be implemented by firmware or software programs executable by a hardware controller, a hardware processor system, or other hardware processing resources. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 187 or receives and executes instructions, parameters, and profiles 187 responsive to a propagated signal, at a device connected to a network 170. Further, the instructions 187 may be transmitted or received over the network 170 via the network interface device 160. The information handling system 100 may include a set of instructions 187 that may be executed to optimize an amount of memory reserved at the data center 150 for storage of a fingerprint hash table used in deduplication processes during a future time window. For example, instructions 187 may include a particular example of a predictive hash table and CO2 minimizing system 180, or other aspects or components. Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

The predictive hash table and CO2 minimizing system 180 may utilize a computer-readable medium 186 in which one or more sets of instructions 187 may operate in part as software or firmware instructions executed via hardware processing resources on the information handling system 100. The instructions 187 may embody one or more of the methods as described herein. For example, code instructions relating to the predictive hash table and CO2 minimizing system 180, firmware or software algorithms, processes, and/or methods may be stored here. Such code instructions 187 may comprise determining an optimal amount of memory to reserve at the data center 150 for storage of a fingerprint hash table used in deduplication processes during a future time window. For example, instructions 187 may include a particular example of a predictive hash table and CO2 minimizing system 180, or other aspects or components. The predictive hash table and CO2 minimizing system 180 may operate on hardware processing resources within a Unified Endpoint Management (UEM) platform 100 that gathers telemetries from a plurality of data storage system/data center(s) (e.g., 150) via the network 170 that describe operating environments for those data storage system/data center(s) (e.g., 150). The UEM platform 100 in an embodiment may operate to identify information technology (IT) issues at data storage system/data center(s) 150, and to provide support for such issues, including automatically updating drivers or hardware components, as needed. The UEM platform in an embodiment may operate as a cloud-based service to store data (e.g., operating environment telemetries for remote data storage system/data center(s) 150) within memory 102, static memory 103, or computer readable medium 186 received via network 170. In some embodiments the information handling system 100 may be a server executing a UEM platform.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 of the predictive hash table and CO2 minimizing system 180 may be stored in static memory 103, or the drive unit 107 on a computer-readable medium 186 such as a flash memory or magnetic disk in an example embodiment. More specifically, telemetries describing power consumption and workloads for data storage system/data center(s) (e.g., 150) may be stored within memory 102, static memory 103, or drive unit 107.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware, or as software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The hardware system, hardware device, hardware controller, or hardware module may execute software, including firmware embedded at a device, such as an Intel® Core class hardware processor, ARM® brand hardware processors, Qualcomm® hardware processors, or other hardware processors and chipsets, or other such device, or software capable of operating a relevant environment of the information handling system. The hardware system, hardware device, hardware controller, or hardware module may also comprise a combination of the foregoing examples of hardware, hardware processors, or controllers executing firmware or software. In an embodiment an information handling system 100 may include an integrated circuit or a board-level product having portions thereof that may also be any combination of hardware and hardware executing software. Hardware devices, hardware modules, hardware resources, or hardware controllers that are in communication with one another need not be in continuous communication with each other, unless expressly specified otherwise. In addition, hardware devices, hardware modules, hardware resources, or hardware controllers that are in communication with one another may communicate directly or indirectly through one or more intermediaries.

Figure 2:
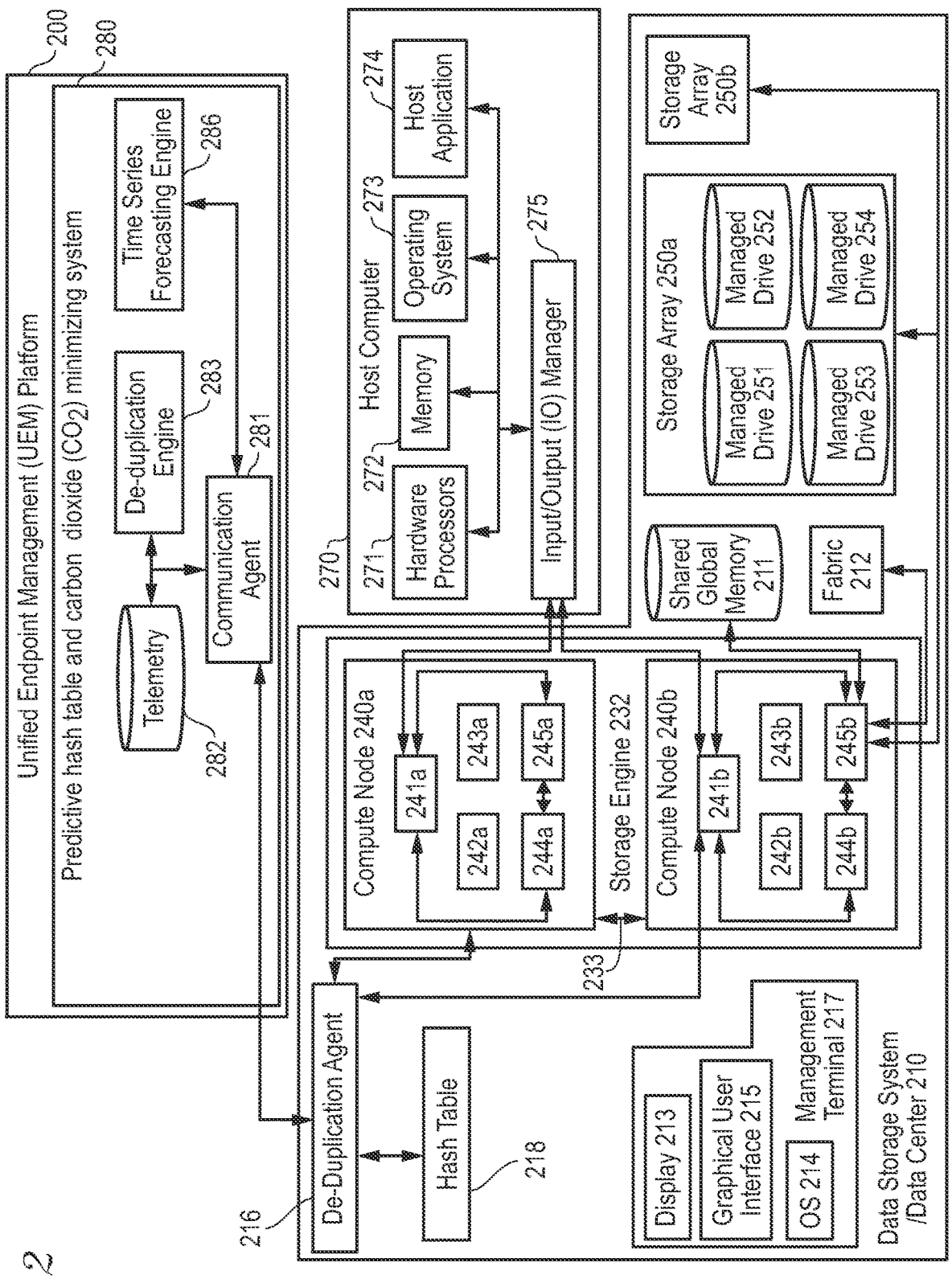
FIG. 2 is a block diagram illustrating a predictive hash table and carbon dioxide (CO2) minimizing system executing on a UEM information handling system to manage an enterprise data storage system with one or more data centers according to an embodiment of the present disclosure.

FIG. 2 is a block diagram illustrating a predictive hash table and carbon dioxide (CO2) minimizing system 280 for tailoring the memory storage space reserved within a data center 210 for storage of a deduplication fingerprint hash table 218 to a forecasted size of the fingerprint hash table 218, in order to decrease power consumed by unnecessarily reserved memory resources and consequent greenhouse gases emitted. Memory storage space may be reserved for a deduplication hash table 218 at one or more memory devices at the data center 210, including for example, 243a. 243b, shared global memory 211, storage array 250a, or 250b, or another memory device. A future size for a fingerprint hash table 218 may be forecasted in an embodiment by a hardware processor executing code instructions of a time series forecasting engine 286 of the predictive hash table and CO2 minimizing system 280 operating at a unified endpoint management (UEM) platform 200, based on a forecasted future load of deduplication processes forecasted to occur during an upcoming time window at the data storage system/data center 210. As described herein, a data storage system 210 in various embodiments herein may comprise one or more data centers, each data center within a data storage system having multiple data centers may be located in a different geographic area than other data centers. Each data center (e.g., 210) in an example embodiment may comprise at least one compute node (e.g., 240a), a hardware processor executing code instructions of a deduplication agent 216, a management terminal 217, and at least one storage array 250a. These data storage system hardware components each may be explained in greater detail below.

In an embodiment, the data storage system/data center(s) 210 may provide data storage services for a plurality of host computers (e.g., 270), which may act as client information handling systems within an enterprise system. The host computer 270 in an embodiment may comprise one or more hardware processors 271, a local-to-host memory 272, an operating system 273, and one or more host applications 274. The processor(s) 271 in an embodiment may comprise one or more multi-core processors including central processing unit (CPU), graphics processing unit (GPU), or combinations thereof. The local-to-host memory 272 in an embodiment may include volatile memory (e.g., Random Access Memory (RAM) of any type), or tangible persistent storage components of one or more technology types (e.g., Solid State Drives (SSDs), Hard Disk Drives (HDDs), Storage Class Memory (SCM), Enterprise Flash Drives (EFDs), Serial Advanced Technology Attachment (SATA) drives, or Fiber Channel (FC) drives. The host computer 270 in an embodiment may support multiple virtual hosts running on virtual machines or containers. In some embodiments, host computer 270 may be implemented as a virtual machine within storage system 210.

In an embodiment, the host application 274 may comprise any type of software directing the processor 271 to access data stored in memory either locally (e.g., at 272 comprising volatile memory or persistent storage), or within the data storage system/data center(s) 210. More specifically, host application 273 in an example embodiment may include file servers, e-mail servers, block servers, software development testbeds, or databases. The data storage system/data center(s) 210 in an embodiment may maintain data for the host application 274 running on the host computer 270. For example, host application 274 may write data of the host application 274 to the data storage system/data center(s) 210 and read data of host application 274 from the data storage system/data center(s) 210, via an input/output (IO) manager 275, in order to perform various functions.

The data storage system/data center(s) 210 in an embodiment may comprise one or more storage engines (e.g., 232), which may each further comprise one or more compute nodes 240a, or 240b, possibly including but not limited to storage servers and storage directors for providing data storage services. For example, storage engine 232 in an embodiment may comprise compute nodes 240a and 240b. In some embodiments, pairs of the compute nodes (e.g., 240a and 240b) are organized within a storage engine (e.g., 232), for purposes of facilitating failover between compute nodes (e.g., between 240a and 240b) within storage system 210. In some embodiments, the paired compute nodes (e.g., 240a and 240b) of each storage engine (e.g., 232) are directly interconnected by communication links (e.g., 233). As used herein, the term "storage engine" will refer to a storage engine, such as storage engine 232, which has a pair of (two independent) compute nodes (e.g., 240a and 240b.). A given storage engine (e.g., 232) is implemented using a single physical enclosure and provides a logical separation between itself and other storage engines of the storage system 210. A given storage system 210 may include one or more of such storage engines (e.g., 232).

Each compute node (e.g., 240a, or 240b), includes processors (e.g., 242a or 242b) and a local-to-node volatile memory (e.g., 243a, or 243b). The processors (e.g., 242a or 242b) may include a plurality of multi-core processors of one or more types, e.g., including multiple CPUs, GPUs, and combinations thereof. Each processor (e.g., 242a or 242b) of the data storage system/data center(s) 210 in an embodiment may be referred to herein as "local-to-data storage system,"

indicating location of that processor within the data storage system/data center(s) 210, or "local-to-node," indicating location of the processor within a computing node (e.g., 242a or 242b, respectively) of the data storage system/data center(s) 210. Processors (e.g., 242a, or 242b) referred to herein as "local-to-data storage system," or "local-to-node," in such a manner may also be considered as remote hardware processors from the perspective of the UEM platform 200, in that the hardware processors (e.g., 242a or 242b) located at the data storage system/data center(s) 210 in an embodiment may be located "remotely" from the UEM platform 200.

The local-to-node volatile memory (e.g., 243a, or 243b) may include, for example and without limitation, any type of RAM. Each compute node (e.g., 240a, or 240b) may also include one or more front end adapters (e.g., 241a, or 241b, respectively) for communicating with the host computer 270 and a deduplication agent 216 of the data storage system/data center(s) 210. Each compute node (e.g., 240a, or 240b) may also include one or more back-end adapters (e.g., 245a, or 245b, respectively) for communicating with respective associated back-end drive arrays (e.g., 250a, or 250b), thereby enabling access to managed drives (e.g., 251, 252, 253, or 254). A given storage system 210 may include one back-end drive array (e.g., 250a) or multiple back-end drive arrays (e.g., 250a and 250b).

In some embodiments, managed drives (e.g., 251, 252, 253, or 254) are storage resources dedicated to providing data storage to storage system 210 or are shared between a set of storage systems (e.g., 210). Managed drives (e.g., 251, 252, 253, or 254) may be implemented using numerous types of memory technologies, for example and without limitation, any of the SSDs and HDDs mentioned above. In some embodiments the managed drives (e.g., 251, 252, 253, or 254) are implemented using NVM (Non-Volatile Memory) media technologies, such as NAND-based flash, or higher-performing SCM (Storage Class Memory) media technologies such as 3D XPoint and ReRAM (Resistive RAM). Managed drives (e.g., 251, 252, 253, or 254) may be directly connected to the compute nodes (e.g., 240a or 240b) using a PCIe (Peripheral Component Interconnect Express) bus or may be connected to the compute nodes (e.g., 240a or 240b) for example, by an IB (InfiniBand) bus or fabric.

In some embodiments, each compute node (e.g., 240a or 240b) also includes one or more channel adapters (e.g., 244a, or 244b, respectively) for communicating with other compute nodes directly or via an interconnecting fabric 212. An example interconnecting fabric 212 may be implemented using InfiniBand. Each compute node (e.g., 240a or 240b) may allocate a portion or partition of its respective local-to-node volatile memory (e.g., 243a, or 243b, respectively) to a virtual shared "global" memory 211 that can be accessed by other compute nodes (e.g., 240a or 240b), e.g., via DMA (Direct Memory Access) or RDMA (Remote Direct Memory Access). Shared global memory 211 will also be referred to herein as the cache of the storage system 210.

As described herein, the data storage system/data center(s) 210 maintains data for the host applications 274 running on one or more enterprise host computers (e.g., 270). Logical storage devices are created and presented to the host application 274 for storage of the host application 274 data. The host memory 272 is a single data storage device having a set of contiguous fixed-size LBAs (Logical Block Addresses) on which data used by the host application 274 resides and can be stored. However, the data used by the host application 274 and the storage resources available for use by the host application 274 may actually be maintained by the compute nodes (e.g., 240a, or 240b) at non-contiguous addresses (tracks) on various different managed drives (e.g., 251, 252, 253, or 254), compute node memories (e.g., 243a or 243b), or the shared global memory 211 within data storage system/data center(s) 210.

In some embodiments, the data storage system/data center(s) 210 maintains metadata that indicates, among various things, mappings between the memory 272 of the host computer 270 and the locations of extents of host application data in the managed drives (e.g., 251, 252, 253, or 254), compute node memories (e.g., 243a or 243b), or the shared global memory 211. In response to an IO (Input/Output command) generated at the host application 274 in an embodiment, the operating system (OS) 273 may determine whether the command can be serviced by accessing the host memory 272. If that is not possible, then the OS 273 prompts the IO manager 275 to transmit the IO command to one of the compute nodes (e.g., 240a, or 240b) to be serviced by the data storage system/data center(s) 210.

There may be multiple paths between the host computer 270 and the storage system 210, e.g., one path per front end adapter (e.g., 245a or 245b). The paths may be selected based on a wide variety of techniques and algorithms including, performance, load balancing, and CO2 minimization techniques. In the case where IO manager 275 generates a read command, the storage system 210 uses metadata to locate the commanded data, e.g., in the managed drives (e.g., 251, 252, 253, or 254), compute node memories (e.g., 243a or 243b), or the shared global memory 211. If the commanded data is not in the virtual shared global memory 211, then the data in an embodiment may be temporarily copied into the virtual shared global memory 211 from the managed drives (e.g., 251, 252, 253, or 254), or compute node memories (e.g., 243a or 243b) and sent to the host application 274 by the front-end adapter (e.g., 245a or 245b) of one of the compute nodes (e.g., 240a or 24b, respectively). In the case where the IO manager 275 generates a write command, in some embodiments the storage system 210 in an embodiment may copy a block being written into the virtual shared global memory 211 and create new metadata that maps the address of the data on the virtual shared global memory 211 to a location to which the block is written on the managed drives (e.g., 251, 252, 253, or 254). The virtual shared global memory 211 in an embodiment may enable the block written on the managed drives (e.g., 251, 252, 253, or 254) to be reachable via all of the compute nodes (e.g., 240a, or 240b) and paths, although the storage system 210 can be configured to limit use of certain paths to certain compute nodes.

When a write IO command is received at the data storage system 210, this may trigger a deduplication agent 216 to determine whether a copy of the same data has already been stored at the data storage system/data center 210. As described in greater detail below with respect to FIG. 3, a hardware processor executing code instruction of the deduplication agent 216 at the data storage system/data center 210 may do so by accessing a deduplication fingerprint hash table 218 and determining whether the fingerprint hash value for the incoming write IO command matches a fingerprint hash value stored within the hash table 218 for a previously stored track of data.

The fingerprint hash table 218 in an embodiment may be stored in one or more various locations in the data storage system 210, including a local-to-node memory (e.g., 243a or 243b), a shared global memory 211, a managed drive (e.g., 251, 252, 253, or 254), or a storage array (e.g., 250a, or 250b). For instance, multiple hash tables (e.g., 218) may be stored within the data storage system/data center 210, with each table (e.g., 218) providing fingerprint hash values for tracks within a sub-portion of memory within the data center 210. More specifically, each computing node (e.g., 240a or 240b) in an embodiment may have a separate stored fingerprint hash table listing the hash values for only the tracks accessible by a specific computing node (e.g., 240a, or 240b, respectively) and stored at various locations within the data storage system/data center 210 (e.g., 243a, 243b, 211, 250a, 250b, 251, 252, 253, 254). In another embodiment, a data center-wide stored fingerprint hash table listing the hash values for all data tracks stored at various locations within the data storage system/data center 210 (e.g., 243a, 243b, 211, 250a, 250b, 251, 252, 253, 254) may be stored in a shared global memory 211 accessible by all computing nodes (e.g., 240a, or 240b) of the data storage system/data center 210. As another example, each managed drive (e.g., 251, 252, 253, or 254) in an embodiment may have a separate stored fingerprint hash table listing the hash values for only the tracks stored within a specific managed drive (e.g., 251, 252, 253, 254, respectively). Additionally, each storage array (e.g., 250a or 250b) in an embodiment may have a separate stored fingerprint hash table listing the hash values for only the tracks stored within that specific storage array (e.g., 250a, or 250b, respectively).

The data storage system/data center(s) 210 in an embodiment may further comprise a display 213 for display of a graphical user interface 215, as well as an operating system 214 to operate as a management terminal 217 in some embodiments herein. A user of the management terminal 217 within the data storage system/data center 210 in an embodiment may use the graphical user interface 215, displayed via the display 213 to manage and monitor policies used by the deduplication engine 283 of the predictive hash table and CO2 minimizing system 280 to tailor the amount of memory reserved within the data storage system/data center 210 for storage of the hash table 218, as described in greater detail herein. For example, the user or manager of the data storage system/data center 210 in an embodiment may input, via the GUI 215, a burst buffer value r that forcibly increases the amount of memory reserved for storage of the hash table 218 above the size of the hash table predicted to be generated during an upcoming window by the predictive hash table and CO2 minimizing system 280. Thus, the burst buffer value r may act as a floor or minimum amount of memory allocated for storage of the hash table during the upcoming time window. This may be useful in situations where the user or manager expects an unusual burst in activity at the data storage system/data center 210 during that upcoming time window, for example.

More generally, this burst buffer value r may provide a buffer of extra storage space to accommodate a manager's confidence in the ability of the predictive hash table and CO2 minimizing system 280 to accurately predict the size of the fingerprint hash table 218 generated during an upcoming time window. Thus, the burst buffer value r in an embodiment may ensure a reserved storage space floor or minimum value. For example, the manager may input a minimum value of one for the burst buffer value r to demonstrate complete confidence in the prediction. As described in greater detail below with respect to equations (3) and (4), this will prompt the predictive hash table and CO2 minimizing system 280 in an embodiment to allocate just enough memory resources to store a hash table 218 of exactly the size predicted by the time series forecasting engine 286. The manager may increase the value of r in order to allocate extra memory resources to store the hash table 218 just in case the time series forecasting engine 286 underestimates the size of the hash table 218 to be generated during the upcoming time window. The maximum amount of storage space that may be allocated for storage of the hash table 218 may be limited by the amount of storage available on all physical memory devices within a computing node or available to a computing node at which the hash table 218 may be stored. For example, if the hash table 218 is stored at a local-to-node memory 243a that has a maximum storage space of one terabyte, then the maximum amount of memory allocated to storage of the hash table 218 may be one terabyte. As a consequence, the maximum value of r that the manager may choose in an embodiment may result in the maximum storage space available on the physical memory device to which the hash table 218 may be stored. The manager may adjust this burst buffer value r via the GUI 215 in an embodiment as confidence in these predictions over time increase or decrease.

In other example embodiments, the predictive hash table and CO2 minimizing system 280 in an embodiment may use a forced minimizing value s to cap the amount of memory reserved for storage of the hash table 218 in the case where the time series forecasting engine 286 predicts that the size of the hash table 218 will decrease during an upcoming time window. Thus, the forced minimizing value s in an embodiment may ensure a reserved storage space ceiling or maximum value. As with the burst buffer value r, the manager may adjust the forced minimizing value s based on confidence in the predictions of the predictive hash table and CO2 minimizing system 280 in an embodiment. For example, the manager may input a minimum value of one for the forced minimizing value s to demonstrate complete confidence in the prediction. This will prompt the predictive hash table and CO2 minimizing system 280 in an embodiment to allocate at least enough memory resources to store a hash table 218 of the size predicted by the time series forecasting engine 286. As described in greater detail below with respect to equations (5) and (6) below, the manager may increase the value of s in order to decrease memory resources to store the hash table 218 just in case the time series forecasting engine 286 overestimates the size of the hash table 218 to be generated during the upcoming time window. The minimum amount of storage space that may be allocated for storage of the hash table 218 may be limited by the amount of storage available on a single physical memory device within a computing node or available to a computing node at which the hash table 218 may be stored. For example, if the hash table 218 is stored at a storage array 250a, comprising managed drives 251, 252, 253, and 254, then the minimum amount of storage that may be allocated to storage of the fingerprint hash table 218 in an embodiment may be equivalent to the maximum storage space (e.g., 1 GB) for the smallest of these managed drives. The manager may adjust this forced minimizing value via the GUI 215 in an embodiment as confidence in these predictions over time increase or decrease.

In yet another example, the user or manager of the data storage system/data center 210 in an embodiment may input, via the GUI 215, a high-encryption rate forced minimizing value p that forcibly decreases the amount of memory reserved for storage of the hash table 218 below the size of the hash table predicted to be generated during an upcoming window by the predictive hash table and CO2 minimizing system 280. Thus, the high-encryption rate forced minimizing value p in an embodiment may ensure another reserved storage space ceiling or maximum value. This may be useful in situations where the user or manager expects a high volume of encrypted data writes to occur during the upcoming time window, for example. The encrypted data writes may generate hash entries to increase the hash table size, but deduplication may not operate on encrypted entries. Thus, this may also be useful when the size of the fingerprint hash table is predicted to increase, even though the volume of deduplication tasks are predicted to remain steady or decrease. As described herein, encrypted tracks cannot be deduplicated, and consequently, each encrypted data track written to memory within the data storage system/data center 210 in an embodiment may receive a separate hash table entry. However, there is no need to generate a fingerprint hash value for an encrypted track because fingerprint hash values are used to deduplicate tracks, and encrypted tracks cannot be deduplicated. As a consequence, the manager of the data storage system/data center 210 may forcibly cap the size of the fingerprint hash table 218 generated during a time window (e.g., by capping the amount of memory available for storage of the fingerprint hash table 218), such that any fingerprint hash values generated once that capped size has been reached are not stored within the fingerprint hash table 218 to save energy and $CO_2$ generation since most will be encrypted.

A high-encryption rate forced minimizing value p in an embodiment may be set by the manager based on confidence in the deduplication workload and the fingerprint hash table size predicted by the predictive hash table and $CO_2$ minimizing system. For example, the manager may input a maximum value of zero for the high-encryption rate value forced minimizing value p to demonstrate high confidence in these predictions. As described below with respect to equations (7) and (8), this will prompt the predictive hash table and $CO_2$ minimizing system 280 in an embodiment to reserve the same amount of memory for storage of the hash table 218 during the upcoming time window as is already reserved for storage of the hash table 218 during the current time window. Essentially, this means the predictive hash table and $CO_2$ minimizing system may disregard the prediction that indicates a large volume of encryption tasks may influence the size of the fingerprint hash table 218 during the upcoming time window. As also described in greater detail below with respect to equations (7) and (8) below, because the high-encryption rate forced minimizing value p has a negative value (e.g., maximum value of zero), the manager may decrease the value of p in order to forcibly decrease memory resources to store the hash table 218 to limit the number of hash table entries resulting from encryption tasks. The minimum amount of storage space that may be allocated for storage of the hash table 218 may be limited by the amount of storage available on a single physical memory device within a computing node or available to a computing node at which the hash table 218 may be stored. For example, if the hash table 218 is stored at a storage array 250a, comprising managed drives 251, 252, 253, and 254, then the minimum amount of storage that may be allocated to storage of the fingerprint hash table 218 in an embodiment may be equivalent to the maximum storage space (e.g., 1 GB) for the smallest of these managed drives. The manager may adjust this high-encryption rate forced minimizing value p via the GUI 215 in an embodiment as confidence in these predictions over time increase or decrease.

The hardware processor executing code instruction at the deduplication agent 216 of the data storage system/data center 210 in an embodiment may operate to gather operational telemetry describing operational functionality of the various components of the data storage system/data center(s) 210 and associated power consumption levels, including the storage engine 232, compute nodes 240a, and 240b, compute node processors 242a and 242b, compute node memories 243a and 243b, local-to-node volatile memories 244a and 244b, back-end adapters 245a or 245b, fabric 212, storage arrays 250a and 250b, shared global memory 211, and managed drives 251, 252, 253, and 254. In particular, operational telemetry may include data content deduplication telemetry. The deduplication agent 216 in an embodiment may be in communication with the various hardware components of the data storage system/data center(s) 210 (e.g., storage engine 232, computing nodes 240a, or 240b., compute node processors 242a or 242b, compute node memories 243a or 243b, compute node back-end adapters 245a or 245b, local-to-node volatile memories 244a or 244b, shared global memory 211, fabric 212, storage arrays 250a or 250b, and managed drives 251, 252, 243, or 254) and firmware for those components in an embodiment. For example, execution of the deduplication agent 216 may monitor a workload of deduplication processes and encryption tasks executed by each storage engine (e.g., 232), each compute node (e.g., 240a, or 240b), or each processor (e.g., 242a, or 242b) within each compute node. As another example, the deduplication agent 216 in an embodiment may also access firmware for hardware components (e.g., 232, 240a, 240b, 241a, 241b, 242a, 242b, 243a, 243b, 244a, 244b, 211, 212, 250a, 250b, 251, 252, 253 or 254) to determine power measurements as well as policies or settings for those components at the time of such power measurements. More specifically, the deduplication agent 216 in an embodiment may determine a policy setting for a default amount of memory (e.g., within 243a, 243b, 211, 250, 250b, 251, 252, 253, 254) reserved by the OS 214 or an amount of such memory reserved during a previous time window by the deduplication agent 216, based on predictions made by the predictive hash table and $CO_2$ minimizing system 280. The deduplication agent 216 in an embodiment may further record the size of the hash table 218 generated during each time window and store the user-defined burst buffer value r, forced minimizing value s, or high-encryption rate forced minimizing value p received via the GUI 215.

The deduplication agent 216 of the data storage system/data center(s) 210 in an embodiment may transmit information recorded in such a way at any given time to the communication agent 281 of the predictive hash table and $CO_2$ minimizing system 280 executing as code instructions on a hardware processor or processors at the Unified Endpoint Management (UEM) platform 200. Each of hardware components (e.g., 232, 240a, 240b, 241a, 241b, 242a, 242b, 243a, 243b, 244a, 244b, 211, 212, 250a, 250b, 251, 252, 253 or 254) of the data storage system/data center(s) 210 may be under management of or in communication with the deduplication agent 216, which may act as an interface between the data storage system/data center(s) 210 and the UEM platform 200.

The UEM platform 200 in an embodiment may operate as a cloud-based service in communication with the deduplication agent 216 via a network to identify information technology (IT) issues at a plurality of components within the data storage system/data center(s) 210 within say, a data center. The UEM platform 200 and deduplication agent 216 may also provide support for such issues, including automatically updating drivers or hardware components, as needed. In a specific embodiment of the present disclosure, the UEM platform 200 may gather measurements from various hardware components (e.g., 232, 240a, 240b, 241a, 241b, 242a, 242b, 243a, 243b, 244a, 244b, 211, 212, 250a, 250b, 251, 252, 253 or 254) of the data storage system/data center(s) 210 that describe power consumption, operating environments, and operations executed or power status for those hardware components (e.g., policy settings, power metrics, workload analytics) at one or more data centers. Additionally, operational telemetry may include data content deduplication telemetry.

As described herein, some amount of memory available to each compute node (e.g., 240a, or 240b) and the deduplication agent 216 in an embodiment may be reserved for storage of the fingerprint hash table(s) 218. In existing systems, this default and static reserved storage space may be set by the operating system 214 of the data storage system/data center 210 using a Simple Operating System (SOS) Volume Table of Contents (VTOC), based on an available amount of memory accessible within the data storage system/data center 210 or one or more specific memories (e.g., 243a, 243b, 211, 250a, 250b, 251, 252, 253, 254) therewithin. Because such a default reservation of memory depends on the amount of memory available, rather than upon the amount of memory likely to be actually used by such a hash table (e.g., 218), the default reservation (e.g., by SOS VTOC) may result in over or under reservation of memory resources. In other words, the hash table (e.g., 218) generated through deduplication methods such as that described above may require more or less memory than that reserved for storage of the hash table (e.g., 218) by default means. In most cases, usage of the default method results in reservation of more memory resources than necessary for storage of the hash table (e.g., 218). All memory resources reserved in such a way will be powered on just in case those resources may be used, resulting in powering on of ultimately unused memory resources and generation of unnecessary GHGs.

The hardware processor(s) at the UEM platform 200 information handling system executing code instructions of the predictive hash table storage and CO2 minimizing system 280 in an embodiment tailors the amount of memory reserved at one or more locations (e.g., 243a, 243b, 211, 250a, 250b, 251, 252, 253, 254) within the data storage system/data center 210, and thus power consumed and GHGs emitted, to the actual amount of memory that is forecasted to be needed for storage of the fingerprint hash table(s) (e.g., 218) generated during execution of deduplication processes within a future time window. The communication agent 281 of the predictive hash table and CO2 minimizing system 280 in an embodiment may periodically receive operational telemetry such as data content deduplication telemetry gathered during a training period by the deduplication agent 216 at the data storage system/data center 210. This operational telemetry may include, in an embodiment, stored deduplication metrics describing a number of deduplication processes executed with respect to one or more storage locations (e.g., 243a, 243b, 211, 250a, 250b, 251, 252, 253, 254) within the data storage system/data center 210, corresponding fingerprint hash table sizes, user-defined hash table restriction thresholds (e.g., forced minimizing value s, high-encryption rate forced minimizing value p, or burst buffer value r) and metrics describing power consumption of memory or workload of executed encryption tasks within the training period. The hardware processor executing code instructions of the time series forecasting engine 286 in an embodiment may employ any of several time series forecasting algorithms or models known in the art. For example, the time series forecasting engine 286 in an embodiment may comprise an autoregressive integrated moving average (ARIMA) time series forecasting model.

The time series forecasting engine 286 in an embodiment may use these training period operational telemetry measurements, including data content deduplication telemetry, to model a relationship between a volume of deduplication tasks executed during previous time windows to a volume of deduplication tasks expected to be executed during an upcoming or current time window. This may be performed for each storage array (e.g., 250a, or 250b), or for each managed drive 251, 252, 253, or 254 where a storage array comprises a plurality of managed drives. For example, the execution of algorithmic code instructions for the time series forecasting engine 286 may use the following equation (1) to model such a relationship:

$$Y_t = \alpha + \beta_1 Y_{t-1} + \beta_2 Y_{t-2} + \ldots + \beta_n Y_{t-n} + \varepsilon_t + \varphi_1 \varepsilon_{t-1} + \varphi_2 \varepsilon_{t-2} + \ldots + \varphi_n \varepsilon_{t-n} \quad (1)$$

In such an embodiment, the value Y may represent a number of deduplication processes performed on tracks written to the data storage arrays (e.g., 250a, or 250b) or to the managed drives (e.g., 251, 252, 253, or 254), t may represent a current time window, and t-1 may represent the most recent previous time window. The values for the constants $\alpha$, $\beta$, $\varphi$, and $\varepsilon$ may be adjusted throughout the training period by the time series forecasting engine 286 until the predicted value $Y_t$ differs from the actual workload of deduplication processes executed during the next time window by a maximum allowable error percentage (e.g., 0.01%, 0.1%, 1%, 5%, etc.). This adjustment of constants during the training period may continue for a plurality of training period time windows, up to a value of n time windows from the current time window. As the value of n increases, so too may the accuracy of the time series forecasting engine 286 in adjusting the constants $\alpha$, $\beta$, $\varphi$, and $\varepsilon$, and ultimately, in predicting the workload of deduplication processes expected to be executed during the upcoming time window.

The time series forecasting engine 286 in an embodiment may also use these training period operational telemetry measurements, including data content deduplication telemetry, to model a relationship between a size of the fingerprint hash table 218 generated during previous time windows to a size of the fingerprint hash table 218 predicted to be generated during an upcoming or current time window. This may be performed for each computing node (e.g., 240a or 240b). For example, the execution of algorithmic code instructions for a time series forecasting engine 286 may use the following equation (2) to model such a relationship:

$$Z_t = \gamma + \delta_1 Z_{t-1} + \delta_2 Z_{t-2} + \ldots + \delta_n Z_{t-n} + \mu_t + p_1 \mu_{t-1} + p_2 \mu_{t-2} + \ldots + p_n \mu_{t-n} \quad (2)$$

In such an embodiment, the value Z may represent a size of the fingerprint hash table 218 generated by the deduplication agent based on deduplication tasks performed by each computing node (e.g., 240a or 240b), t may represent a current time window, and t-1 may represent the most recent previous time window. The values for the constants $\gamma$, $\delta$, $\mu$, and p may be adjusted throughout the training period by the time series forecasting engine 286 until the predicted value $Z_t$ differs from the actual size of the fingerprint hash table 218 generated during the next time window by a maximum allowable error percentage (e.g., 0.01%, 0.1%, 1%, 5%, etc.). This adjustment of constants during the training period may continue for a plurality of training period time windows, up to a value of n time windows from the current time window. As the value of n increases, so too may the accuracy of the time series forecasting engine 286 in adjusting the constants $\gamma$, $\delta$, $\mu$, and p, and ultimately, in predicting the size of the fingerprint hash table 218 expected to be generated during the upcoming time window.

Following training of the time series forecasting engine 286 in such a way, the deduplication agent 216 may begin gathering, recording, and transmitting monitoring period operational telemetry measurements including data content deduplication telemetry, similar to those gathered, recorded, and transmitted to the predictive hash table and CO2 minimizing system 280 during the training period. The trained time series forecasting engine 286 may use these monitoring period operational telemetry measurements, including data content deduplication telemetry, to predict a volume of deduplication processes that are expected to occur during a future time window, based on the volume of deduplication processes previously executed within the data storage system/data center 210. These predicted future volumes of deduplication processes may be used by the deduplication engine 283 to later predict an optimal amount of memory that should be reserved for storage of a resulting fingerprint hash table in an embodiment.

Following prediction of a future workload of deduplication processes (e.g., $Y_t$ defined according to equation (1) above), and a predicted size of the fingerprint hash table 218 to be generated during a future time window (e.g., $Z_t$ defined according to equation (2) above), the time series forecasting engine 286 may transmit these predicted values (e.g., $Y_t$ and $Z_t$) to the deduplication engine 283 for determination of an optimal amount of memory to reserve for storage of the fingerprint hash table 218 to be generated during the upcoming time window. As described herein, the predicted size of the fingerprint hash table 218 in an embodiment may differ from the amount of memory that is optimally reserved for storage of the fingerprint hash table 218. For example, the manager of the data storage system/data center 210 may wish to reserve more or less memory space than the expected size of the fingerprint hash table 218 in order to account for the level of confidence in the predicted size of the hash table 218, or an expected burst in write commands not anticipated by the time series forecasting engine 286.

More specifically, in an embodiment, the time series forecasting engine 286 may predict a future workload of deduplication processes to be executed during an upcoming time window that is greater than the most recently recorded volume of deduplication processes executed. In such an embodiment, the deduplication engine 283 may determine an optimal amount of memory to reserve for storage of a fingerprint hash table 218 generated during the upcoming time window based on a user-defined burst buffer value r. As described above, the user-defined burst buffer value r may provide a buffer of extra storage space, or a floor for an amount of allocated storage space to accommodate a manager's confidence in the ability of the predictive hash table and CO2 minimizing system 280 to accurately predict the size of the fingerprint hash table 218 generated during an upcoming time window. The deduplication engine 283 may use this user-defined burst buffer value r, the predicted size of the fingerprint hash table 218 to be generated during the next time window $Z_t$, as received from the time series forecasting engine 286, and execution of algorithmic code instructions for the following equation (3) to determine an anticipated increasing growth rate $G_{INC}$ for the fingerprint hash table 218 that would be allowable by the user (e.g., as based on user-defined burst buffer value r).

$$G_{INC} = \frac{Z_t - Z_{t-1}}{Z_{t-1}} \times 100 \times r \qquad (3)$$

In such an embodiment, the deduplication engine 263 may then use the following equation (4) to determine an optimal amount of memory to reserve for storage of the fingerprint hash table 218 during the upcoming time window, based on the increased growth rate $G_{INC}$ determined using equation (3) above.

$$\sum\nolimits_{node=i}^{node=m} Z_t^{node} = Z_{t-1}^{node} + \left(Z_{t-1}^{node} \times G_{INC}\right) \qquad (4)$$

As described herein, the size of the fingerprint hash table 218 (e.g., $Z_t$) predicted to be generated, as determined using equation (2) above may be determined for each computing node (e.g., 240a and 240b). Execution of algorithmic code instructions for equation (4) above determines the total amount of memory to optimally reserve for storage of the fingerprint hash table 218 by summing together the predicted size of the fingerprint hash table(s) (e.g., 218) generated due to deduplication processes executed by each of the computing nodes, as adjusted by the increased growth rate $G_{INC}$. Because the purpose of the increased growth rate $G_{INC}$ is to forcibly increase the results of equation (4) above, giving a floor for the amount of storage space reserved for storage of the fingerprint hash table 218, the value of $G_{INC}$ may be positive. Further, because the predicted size $z_t$ of the fingerprint hash table 218 is greater than the size $z_{t-1}$ of the fingerprint hash table 218 during a previous time window, in order for the value of $G_{INC}$ to be positive, the burst buffer value r must also be either zero or positive.

As described in greater detail above with respect to user selection of the burst buffer value r, selection of a minimum value of one for this value will prompt the predictive hash table and CO2 minimizing system 280 in an embodiment to allocate just enough memory resources to store a hash table 218 of exactly the size predicted by the time series forecasting engine 286. The manager may increase the value of r, thus increasing the value of $G_{INC}$ and the value of the total amount of memory to optimally reserve for storage of the fingerprint hash table 218 based on the results of equation (4). The manager may do so in order to allocate extra memory resources to store the hash table 218 just in case the time series forecasting engine 286 underestimates the size of the hash table 218 to be generated during the upcoming time window. The maximum amount of storage space that may be allocated for storage of the hash table 218 may be limited by the maximum amount of storage available on all physical memory devices within a computing node or available to a computing node at which the hash table 218 may be stored. In other words, the total amount of memory to optimally reserve for storage of the fingerprint hash table 218 determined using equation (4) above in an embodiment may not exceed the total maximum amount of memory available on all memory devices within or available to a computing node. The predictive hash table and CO2 minimizing system 280 in an embodiment may thus predict an optimal amount of memory to reserve for storage of a hash table 218 to be stored in an upcoming time window. Upon determining this optimal amount of memory that should be reserved for storage of the fingerprint hash table(s) (e.g., 218) in an embodiment according to equation (4), the deduplication engine 283 may transmit this value to the deduplication agent 216 for implementation at the data storage system/data center 210, as described in greater detail below with respect to FIG. 3 to avoid using power for an over-allocated amount of reserved storage for the deduplication hash table 218.

In another example embodiment, the time series forecasting engine 286 may predict a future workload of deduplication processes $Y_t$ to be executed during an upcoming time window that is less than or equivalent to the most recently recorded volume of deduplication processes executed. In such an embodiment, the deduplication engine 283 may determine an optimal amount of memory to reserve for storage of a fingerprint hash table 218 generated during the upcoming time window based on further analysis of the predicted size of the fingerprint hash table $Z_t$. In some cases, the volume of deduplication processes $Y_t$ to be executed in a future time window is not predicted to increase, and the size of the fingerprint hash table $Z_t$ is also not predicted to increase. This may be the case when most or all entries of the fingerprint hash table 218 during the upcoming time window are likely to be the result of deduplication processes executed on non-encrypted data tracks/records. In that case, as the number of deduplication processes $Y_t$ decreases, so too would the number of entries and overall size $Z_t$ of the fingerprint hash table 218.

In other cases, the volume of deduplication processes $Y_t$ to be executed in a future time window is not predicted to increase, but the size of the fingerprint hash table $Z_t$ is expected to increase. This may be the case when some number of entries in the hash table 218 during the upcoming time window are expected to result from storage of encrypted data tracks/records within the data storage system/data center 210. An increase in encryption tasks may increase the size of the fingerprint hash table 218 because each encrypted data record receives an entry in the hash table, but cannot be deduplicated, as described herein. Thus, as the volume of encryption tasks increases, the size of the hash table $Z_t$ may increase, despite no growth in the volume of deduplication processes $Y_t$. As a consequence, the predictive hash table and CO2 minimizing system 280 in an embodiment may reserve a different amount of memory for storage of the fingerprint hash table when the volume of deduplication processes is not expected to grow, dependent upon the predicted volume of encryption tasks for the upcoming time period.

In an embodiment where the time series forecasting engine 286 has predicted no growth in the predicted volume of deduplication tasks $Y_t$, and has predicted no growth in the size of the fingerprint hash table $Z_t$, the deduplication engine 283 may determine an optimal amount of memory to reserve for storage of a fingerprint hash table 218 generated during the upcoming time window using a forced minimizing value s. As described above, the predictive hash table and CO2 minimizing system 280 in an embodiment may use a forced minimizing value s to cap the amount of memory reserved for storage of the hash table 218 and the manager may adjust the forced minimizing value based on confidence in the predictions of the predictive hash table and CO2 minimizing system 280 in an embodiment.

The deduplication engine 283 may use this user-defined forced minimizing value s, the predicted size of the fingerprint hash table 218 to be generated during the next time window $Z_t$, as received from the time series forecasting engine 286, and execution of algorithmic code instructions of the following equation (5) to determine an anticipated decreasing growth rate $G_{DEC}$ for the fingerprint hash table 218 that would be allowable by the user (e.g., as based on user-defined forced minimizing value s).

$$G_{DEC} = \frac{Z_t - Z_{t-1}}{Z_{t-1}} \times 100 \times s \tag{5}$$

Because this equation is used when the size of the fingerprint hash table is predicted to decrease, such that $Z_t - Z_{t-1}$ is a negative value, the decreasing growth rate $G_{DEC}$ may also have a negative value. In such an embodiment, the deduplication engine 263 may then use execution of algorithmic code instructions for the following equation (6) to determine an optimal amount of memory to reserve for storage of the fingerprint hash table 218 during the upcoming time window, based on the decreased growth rate $G_{DEC}$ determined using equation (5) above.

$$\sum_{node=i}^{node=m} Z_t^{node} = Z_{t-1}^{node} + \left(Z_{t-1}^{node} \times G_{DEC}\right) \tag{6}$$

As described herein, the size of the fingerprint hash table 218 (e.g., $Z_t$) predicted to be generated, as determined using an algorithmic set of code instructions implementing equation (2) above may be determined for each computing node (e.g., 240a and 240b). Algorithmic code instructions for equation (6) above determines the total amount of memory to optimally reserve for storage of the fingerprint hash table 218 by summing together the predicted size of the fingerprint hash table(s) (e.g., 218) generated due to deduplication processes executed by each of the computing nodes, as adjusted by the decreased growth rate $G_{DEC}$. In such a way, the predictive hash table and CO2 minimizing system 280 in an embodiment may predict an optimal amount of memory to reserve for storage of a hash table 218 to be stored in an upcoming time window. Because the purpose of the decreased growth rate $G_{DEC}$ is to forcibly decrease the results of equation (6) above, giving a ceiling for the amount of storage space reserved for storage of the fingerprint hash table 218, the value of $G_{DEC}$ may be negative. Further, because the predicted size $z_t$ of the fingerprint hash table 218 is less than the size $z_{t-1}$ of the fingerprint hash table 218 during a previous time window, in order for the value of $G_{DEC}$ to be negative, the forced minimization value s must be either zero or positive. As described in greater detail above with respect to user selection of the forced minimizing value s, selection of a minimum value of one for this value will prompt the predictive hash table and CO2 minimizing system 280 in an embodiment to allocate at least enough memory resources to store a hash table 218 of the size predicted by the time series forecasting engine 286. The manager may increase the value of s, thus decreasing the value of $G_{DEC}$ (because $G_{DEC}$ has a negative value) and the value of the total amount of memory to optimally reserve for storage of the fingerprint hash table 218 based on the results of equation (6). The manager may do so in order to forcibly decrease the amount of memory resources to store the hash table 218 just in case the time series forecasting engine 286 overestimates the size of the hash table 218 to be generated during the upcoming time window. The minimum amount of storage space that may be allocated for storage of the hash table 218 may be limited by the amount of storage available on a single physical memory device within a computing node or available to a computing node at which the hash table 218 may be stored. In other words, the total amount of memory to optimally reserve for storage of the fingerprint hash table 218 determined using equation (6) above in an embodiment may not fall below the maximum amount of memory available on the smallest available memory device within or available to a computing node. Upon determining this optimal amount of memory that should be reserved for storage of the fingerprint hash table(s) (e.g., 218) in an embodiment according to equation (6), the deduplication engine 283 may transmit this value to the deduplication agent 216 for implementation at the data storage system/data center 210, as described in greater detail below with respect to FIG. 3 to avoid using power for an over-allocated amount of reserved storage for the deduplication hash table 218.

In yet another embodiment, the time series forecasting engine 286 may predict no growth in the volume of deduplication processes $Y_t$ to be executed during an upcoming time window using equation (1) above, and an increase in the size $Z_t$ of the fingerprint hash table 218 using equation (2) above. This may indicate that the increase in the size of the fingerprint hash table $Z_t$ may occur due to a high volume of encryption tasks, despite a lack of need to record such encrypted tracks within the fingerprint hash table. In such an embodiment, the deduplication engine 283 may use a high-encryption rate forced minimizing value p associated with an anticipated burst in encryption tasks during an upcoming window to determine an optimal amount of memory to reserve for storage of the fingerprint hash table. In other words, it may be optimal to forcibly cap the size of memory made available for the fingerprint hash table storage as a way to avoid unnecessary entries within the fingerprint hash table 218 associated with the encrypted tracks. As described above, this high-encryption rate forced minimizing value p may be set by the manager of the data storage system/data center 210 based on confidence in the predicted workload of deduplication tasks $Y_t$ and the predicted size $Z_t$ of the fingerprint hash table 218.

The deduplication engine 283 may use this user-defined high-encryption rate forced minimizing value p, the predicted size of the fingerprint hash table 218 to be generated during the next time window $Z_t$, as received from the time series forecasting engine 286, and execution of algorithmic code instructions for the following equation (7) to determine an anticipated encryption-capped growth rate GE-CAP for the fingerprint hash table 218 that would be allowable by the user (e.g., as based on user-defined high encryption rate forced minimizing value p).

$$G_{E-CAP} = \frac{Z_t - Z_{t-1}}{Z_{t-1}} \times 100 \times p \quad (7)$$

In such an embodiment, the deduplication engine 263 may then use the following equation (8) to determine an optimal amount of memory to reserve for storage of the fingerprint hash table 218 during the upcoming time window, based on the encryption-capped growth rate GE-CAP determined using equation (7) above.

$$\sum\nolimits_{node=i}^{node=m} Z_t^{node} = Z_{t-1}^{node} + \left(Z_{t-1}^{node} \times G_{E-CAP}\right) \quad (8)$$

As described herein, the size of the fingerprint hash table 218 (e.g., $Z_t$) predicted to be generated, as determined using equation (2) above may be determined for each computing node (e.g., 240a and 240b). Execution of algorithmic code instructions for equation (8) above determines the total amount of memory to optimally reserve for storage of the fingerprint hash table 218 by summing together the predicted size of the fingerprint hash table(s) (e.g., 218) generated due to encryption tasks and deduplication tasks executed by each of the computing nodes, as adjusted by the encryption-capped growth rate GE-CAP. In such a way, the predictive hash table and CO2 minimizing system 280 in an embodiment may predict an optimal amount of memory to reserve for storage of a hash table 218 to be stored in an upcoming time window. Because the purpose of the encryption-capped growth rate GE-CAP is to forcibly decrease the results of equation (8) above, giving a ceiling for the amount of storage space reserved for storage of the fingerprint hash table 218, the value of GE-CAP may be negative. Further, because the predicted size $z_t$ of the fingerprint hash table 218 is greater than the size $z_{t-1}$ of the fingerprint hash table 218 during a previous time window, in order for the value of GE-CAP to be negative, the high-encryption rate forced minimization value p must also be either zero or negative. As described in greater detail above with respect to user selection of the high-encryption rate value forced minimizing value p, selection of a minimum value of zero for this value will reserve the same amount of memory for storage of the hash table 218 during the upcoming time window as is already reserved for storage of the hash table 218 during the current time window. Essentially, this means the predictive hash table and CO2 minimizing system may disregard the prediction that indicates a large volume of encryption tasks may influence the size of the fingerprint hash table 218 during the upcoming time window. The manager may decrease the value of p, thus decreasing the value of GE-CAP and the value of the total amount of memory to optimally reserve for storage of the fingerprint hash table 218 based on the results of equation (8). The manager may do so in order to forcibly decrease the amount of memory resources to store the hash table 218 just in case the time series forecasting engine 286 overestimates the size of the hash table 218 to be generated during the upcoming time window. The minimum amount of storage space that may be allocated for storage of the hash table 218 may be limited by the amount of storage available on a single physical memory device within a computing node or available to a computing node at which the hash table 218 may be stored. In other words, the total amount of memory to optimally reserve for storage of the fingerprint hash table 218 determined using equation (8) above in an embodiment may not fall below the maximum amount of memory available on the smallest available memory device within or available to a computing node. Upon determining this optimal amount of memory that should be reserved for storage of the fingerprint hash table(s) (e.g., 218) in an embodiment according to equation (8), the deduplication engine 283 may transmit this value to the deduplication agent 216 for implementation at the data storage system/data center 210, as described in greater detail below with respect to FIG. 3. This cap may also avoid power to over-allocation of storage reserved for deduplication hash table when high levels of encrypted memory accesses are expected.

In each of the above described embodiments, the predictive hash table and CO2 minimizing system 280 may also transmit to the deduplication agent 216 an instruction to power down or turn off any memory resources previously reserved for storage of the fingerprint hash table 218 that exceed the optimal amount of memory reserved for storage of the fingerprint hash table 218 for the upcoming time window. In such a way, the predictive hash table and CO2 minimizing system 280 may instruct the deduplication agent 216 of the data storage system/data center 210 to decrease unnecessary power consumption by memory hardware components (e.g., 243a, 243b, 211, 250a, 250b, 251, 252, 253, 254) due to powering on memory unnecessarily reserved for storage of the fingerprint hash table(s) 218).

Figure 3:
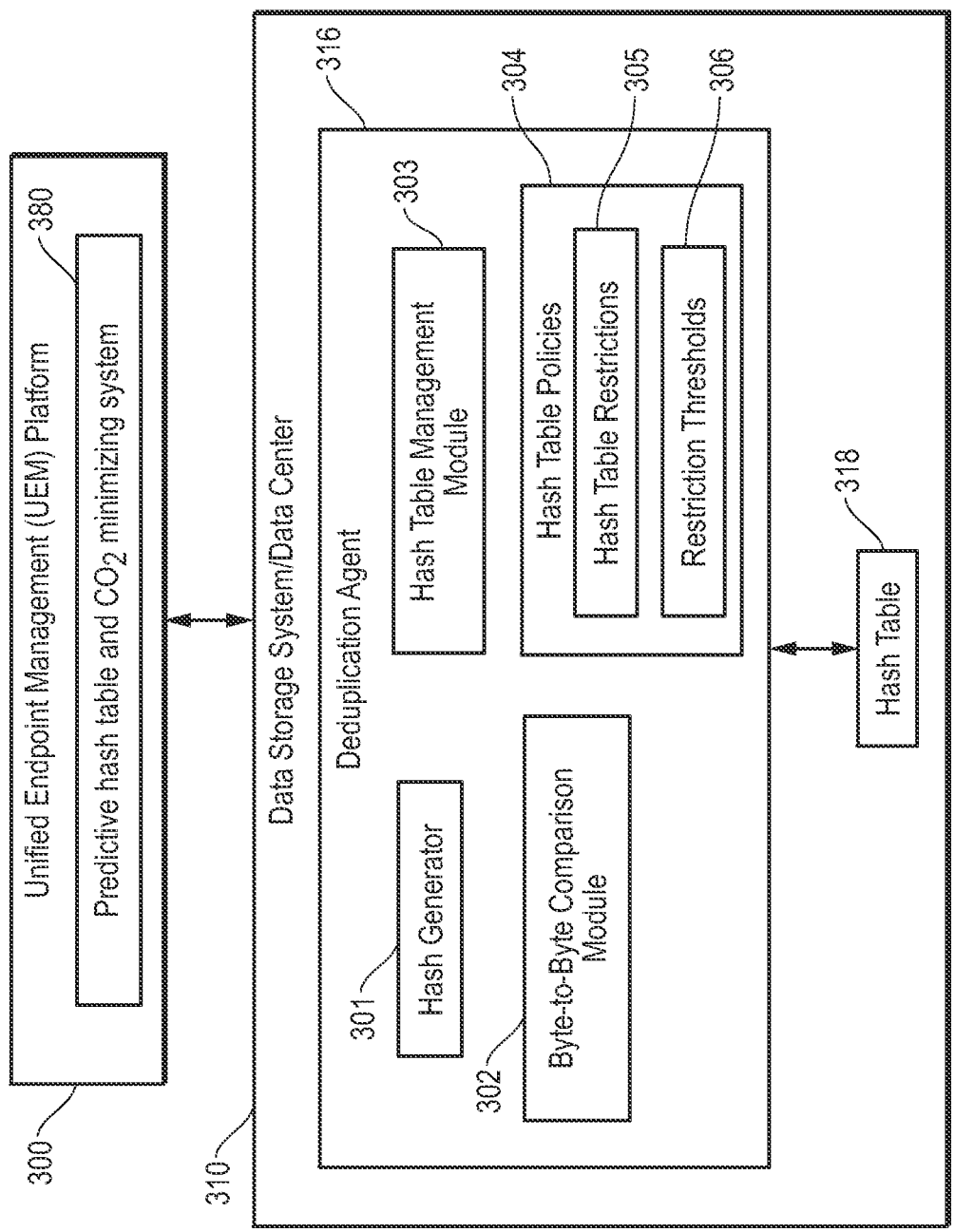
FIG. 3 is a block diagram illustrating deduplication agent operating in tandem with a predictive hash table and CO2 minimizing system according to an embodiment of the present disclosure.

FIG. 3 is a block diagram illustrating deduplication agent operating in tandem with a predictive hash table and carbon dioxide (CO2) minimizing system to reserve an optimized amount of memory for storage of a fingerprint hash table at a data storage system/data center according to an embodiment of the present disclosure. A hardware processor or processors executing code instructions of the deduplication agent 316 of a data storage system/data center 310 in an embodiment may include code instructions of a hash table management module 303 executing on a hardware processor operating to instruct generation of fingerprint hash values within the hash table 318 (corresponding to the hash table 218 of FIG. 2) by the hash generator 301. The hardware processor or processors execute these code instructions in tandem with the code instructions of a byte-to-byte comparison module 302 according to hash table policies 304 as a consequence of deduplication processes or encryption tasks executed by the hardware processor or processors at computing nodes of the data storage system/data center 310. The hash table policies 304 in an embodiment may include hash table restrictions 305 dictating the amount of memory to be reserved for storage of the hash table 318, and restriction threshold values 306 indicating a user-specified high encryption rate threshold value, deduplication workload change threshold value, burst buffer value, forced minimizing value, or high encryption rate forced minimizing value. These user-specified values may be received via a GUI of the data storage system/data center, stored in memory at data center 310 within the restriction thresholds 306, and transmitted within routine monitoring period telemetry measurements to the predictive hash table and CO2 minimizing system 380 executing on a hardware processor or processors at UEM platform 300 as described in greater detail above with respect to FIG. 2.

The processor executing the code instructions of the deduplication agent 316 in an embodiment may operate to minimize storage of duplicate data records within the data storage system/data center 310. For example, a data storage system/data center 310 in an embodiment may receive a plurality (e.g., thousands in some cases) of the same data record, such as storage of an e-mail. The deduplication agent 316 may receive the first copy of such an e-mail, and the hash table management module 303 may instruct the processor executing the code instructions of the hash generator 301 to generate a fingerprint for this first e-mail copy using a cryptographic hash algorithm, such as SHA-256 algorithm, configured to generate a 32-byte hash value for every 32 KB block of data. Another Secure Hash Algorithm (SHA) configured to output a different length digest, such as a 224, 384, or 512 bit digest may also be used depending on the implementation. Likewise, other cryptographic hash algorithms or other algorithms designed to deterministically generate fingerprints from data received by the data storage system/data center 310 in an embodiment may also be used. For ease of explanation, the data fingerprints are referred to herein as "hash" values.

Each time a new data record (e.g., a duplicate copy of the e-mail record previously saved to the data storage system/data center 310) is received, a hash of the received data is generated and compared against all other hash values in the hash table 318. When the processor executing the code instructions of the deduplication agent 316 to indicate hash value for a new entry (e.g., a duplicate copy of the e-mail record previously saved to the data storage system/data center 310) matches a hash value previously stored within the hash table 318 (e.g., pursuant to storage of the original e-mail file), the hash table management module 303 may trigger code instructions of the byte-to-byte comparison module 302 to be executed to compare the two data records having matching hash values. Although it is unlikely, there is a possibility that two different data records (e.g., not copies of one another) may generate the same hash value. Accordingly, to ensure that the two data records having the same hash values are, in fact, copies of one another, the byte-to-byte comparison module 302 may compare each byte of each data record to ensure they are duplicates of the same information. In an embodiment in which the byte-to-byte comparison module 302 determines the two data records are duplicative of one another, the processor executes code instructions of the hash table management module 303 may remove the hash value assigned by the hash generator 301 to the duplicate (e.g., most recently received) data record from the hash table 318 and replace it with a pointer to the hash value for the original data record (of which the most recently received record is a duplicate). The deduplication agent 316 in such an embodiment may further interrupt storage of, or remove the most recently received and duplicative data record within data storage arrays or managed drives of the data storage system/data center 310. In such a way, the deduplication agent 316 ensures that only one copy of duplicative data records may be stored within the data storage system/data center 310, while also ensuring (by use of the pointer within the hash table 318) that any attempt by a host computer to retrieve the duplicative data record results in retrieval of the original data record identified by the pointer within the hash table 318.

The byte-to-byte comparison module 302 in an embodiment may not be capable of performing such a byte-to-byte comparison on encrypted tracks. Each encrypted track written to memory within the data storage system/data center 310 may receive a separate fingerprint hash value entry within the hash table 318. However, those hash values cannot be used to perform a deduplication process, because the byte-to-byte comparison module 302 cannot access the encrypted information. Thus, each entry providing a hash value for an encrypted track in an embodiment unnecessarily increases the size of the fingerprint hash table 318.

Because each deduplication process, such as that described directly above results in a new hash entry within the hash table 318 in an embodiment, the workload or volume of such deduplication processes may also increase the size of the hash table 318. Existing systems reserve a static size of memory resources for storage of the hash table 318 that may over or underestimate the actual size of the hash table 318. For example, a default amount of memory resources within the data storage system/data center 310 in an embodiment may be reserved for storage of the hash table 318 by SOS VTOC, based on the amount of memory available for such storage, which may be stored in hash table restrictions 305. The processor at the UEM platform 300 executing code instructions of the predictive hash table and CO2 minimizing system 380 in an embodiment may tailor the amount of such memory reserved for storage of the hash table 318 to a predicted size of the hash table 318 expected to be generated during an upcoming time window, based on a predicted workload of deduplication processes and predicted size of the fingerprint hash table 318.

As described in greater detail above with respect to FIG. 2, the processor or processor executing the code instructions of the predictive hash table and CO2 minimizing system 380 at the unified endpoint management (UEM) platform 300 in an embodiment may transmit to the deduplication agent 316 of a data storage system/data center 310 a recommended optimal amount of memory to reserve (and power on) for storage of a fingerprint hash table 318 predicted to be generated by computing nodes of the data storage system/ data center 310 during an upcoming time window. Additionally, the predictive hash table and CO2 minimizing system 380 in an embodiment may transmit to the deduplication agent 316 an instruction to power down any memory hardware components of the data storage system/data center 310 previously reserved for storage of a fingerprint hash table 318 that exceeds the optimal amount of memory recommended by the predictive hash table and CO2 minimizing system 380.

Upon receipt of the recommended optimal amount of memory to reserve (and power on) for storage of a fingerprint hash table 318 in an upcoming time window at the deduplication agent 316 in an embodiment, the processor or processor executing the code instructions of the deduplication agent 316 at data center 310 may store this value within the hash table restrictions 305. The hash table management module 303 in such an embodiment may then instruct the hash generator 301 to stop generating new entries to the hash table 318 during that time window once the hash table 318 has reached a size equivalent to the recommended optimal amount of memory stored at 305. In such a way, the deduplication agent 316 in an embodiment may tailor the size of the hash table 318 to meet the optimal amount of memory reserved for storage of the hash table 318, as determined by the predictive hash table and CO2 minimizing system 380 in an embodiment.

Figure 4:
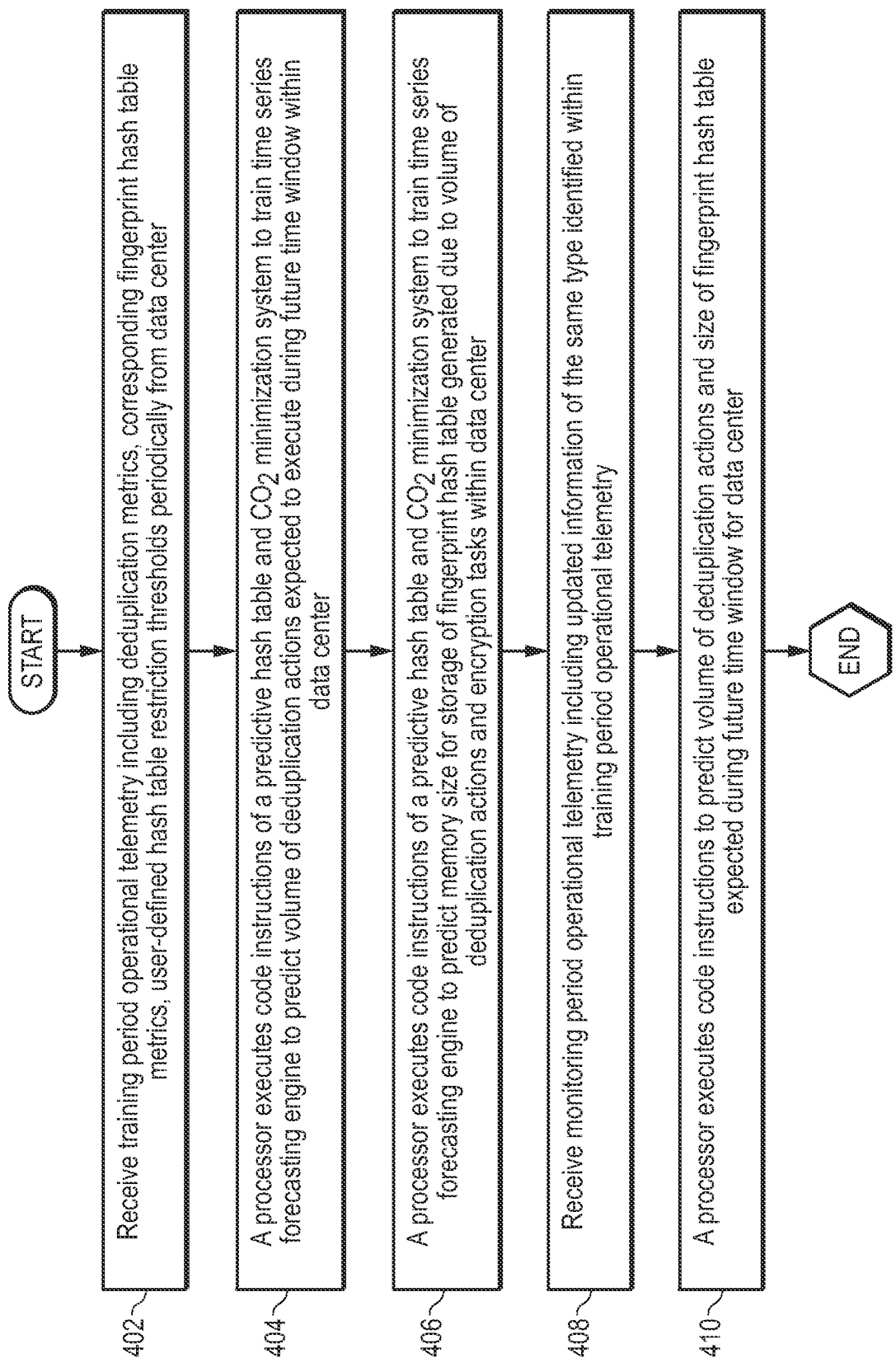
FIG. 4 is a flow diagram illustrating a method of training and using a time series forecasting engine for predicting a future workload of encryption tasks and deduplication processes according to an embodiment of the present disclosure.

FIG. 4 is a flow diagram illustrating a method of training and using a time series forecasting engine during execution of code instructions of the predictive hash table and carbon dioxide (CO2) minimizing system for predicting a future workload of deduplication processes at a processor or processors at a Unified Endpoint Management (UEM) platform information handling system according to an embodiment of the present disclosure. As described herein, the processor or processor executing the code instructions of the predictive hash table storage and CO2 minimizing system in an embodiment may generate instructions to power down overallocated memory resources for storage for a fingerprint hash table by executing a trained time series forecasting engine to predict an optimal amount of memory to reserve for storage of a future fingerprint hash table, based on a predicted volume of deduplication processes to be executed and a predicted size of the future fingerprint hash table generated, at least partially, as a consequence of those deduplication processes. The processor or processor executing the code instructions of the time series forecasting engine in an embodiment may be trained to predict a future volume of deduplication processes based on deduplication metrics previously received over a number of previous time windows in a training period. The time series forecasting engine in embodiments of the present disclosure may also be trained to predict a future size of a fingerprint hash table based on fingerprint hash table size metrics previously received over a number of previous time windows in the training period.

At block 402, the processor or processor executing the code instructions of the predictive hash table and CO2 minimizing system in an embodiment may receive training period operational telemetry, including deduplication metrics, corresponding fingerprint hash table metrics, user-defined hash table restriction thresholds periodically from a data center. For example, in an embodiment described with reference to FIG. 2, a processor or processor executing the code instructions of the deduplication agent 216 at the data storage system/data center 210 may gather and transmit to the communication agent 281 of the predictive hash table and CO2 minimizing system 280 executing at the UEM platform 200 these training period operational telemetries. More specifically, the deduplication agent 216 in an embodiment may operate to gather operational telemetry describing operational functionality of the various components of the data storage system/data center(s) 210, including the storage engine 232, compute nodes 240a, and 240b, compute node processors 242a and 242b, compute node memories 243a and 243b, local-to-node volatile memories 244a and 244b, back-end adapters 245a or 245b, fabric 212, storage arrays 250a and 250b, shared global memory 211, and managed drives 251, 252, 253, and 254. For example, the deduplication agent 216 may monitor a workload of deduplication processes and encryption tasks executed by each storage engine (e.g., 232), each compute node (e.g., 240a, or 240b), or each processor (e.g., 242a, or 242b) within each compute node. As another example, the deduplication agent 216 in an embodiment may also monitor power consumption and access firmware for hardware components (e.g., 232, 240a, 240b, 241a, 241b, 242a, 242b, 243a, 243b, 244a, 244b, 211, 212, 250a, 250b, 251, 252, 253 or 254) to determine policies or settings for those components at the time of such measurements. More specifically, the deduplication agent 216 in an embodiment may determine a policy setting for a default amount of memory (e.g., within 243a, 243b, 211, 250, 250b, 251, 252, 253, 254) reserved by the OS 214 or an amount of such memory reserved during a previous time window by the deduplication agent 216, based on predictions made by the predictive hash table and CO2 minimizing system 280.

The deduplication agent 216 in an embodiment may further record the size of the hash table 218 generated during each time window and store any selection by a user for a user-defined burst buffer value r, forced minimizing value s, or high-encryption rate forced minimizing value p received via the GUI 215. The user or manager of the data storage system/data center 210 in an embodiment may input, via the GUI 215, a burst buffer value r that forcibly increases the amount of memory reserved for storage of the hash table 218 above the size of the hash table predicted to be generated during an upcoming window by the predictive hash table and CO2 minimizing system 280, a forced minimizing value s to cap the amount of memory reserved for storage of the hash table 218, or a high-encryption rate forced minimizing value p that forcibly caps or decreases the amount of memory reserved for storage of the hash table 218 at or below the size of the hash table predicted to be generated during an upcoming window by the predictive hash table and CO2 minimizing system 280 due to expected levels of encrypted memory accesses. The manager may adjust these user-defined hash table restriction thresholds (e.g., r. s, or p) via the GUI 215 in an embodiment as confidence in these predictions over time increase or decrease in relation to the manager's expectations of memory accesses or experience with the predicted hash table size.

The deduplication agent 216 of the data storage system/data center(s) 210 in an embodiment may transmit information recorded in such a way at any given time to the communication agent 281 of the predictive hash table and CO2 minimizing system 280 executing at the Unified Endpoint Management (UEM) platform 200. Each of hardware components (e.g., 232, 240a, 240b, 241a, 241b, 242a, 242b, 243a, 243b, 244a, 244b, 211, 212, 250a, 250b, 251, 252, 253 or 254) of the data storage system/data center(s) 210 may be under management of or in communication with the deduplication agent 216, which may act as an interface between the data storage system/data center(s) 210 and the UEM platform 200.

In another example embodiment described with reference to FIG. 3, the hash table policies 304 in an embodiment may include hash table restrictions 305 dictating the amount of memory to be reserved for storage of the hash table 318, and restriction threshold values 306 indicating a user-specified high encryption rate threshold value, deduplication workload change threshold value, burst buffer value, forced minimizing value, or high encryption rate forced minimizing value. These user-specified values may be received via a GUI of the data storage system/data center, stored within the restriction thresholds 306, and transmitted within routine monitoring period telemetry measurements to the predictive hash table and CO2 minimizing system 380.

A processor or processor executing the code instructions of the predictive hash table and CO2 minimizing system in an embodiment may train a time series forecasting engine at block 404 to predict a future volume of deduplication processes expected to execute during that time window within a remote data center. For example, in an embodiment described with reference to FIG. 2, a processor or processor executing the code instructions of the time series forecasting engine 286 may use the training period operational telemetry measurements received at block 402, including data content deduplication telemetry, to model a relationship between a volume of deduplication tasks executed during previous time windows to a volume of deduplication tasks expected to be executed during an upcoming or current time window. This may be performed for each storage array (e.g., 250a, or 250b), or for each managed drive 251, 252, 253, or 254 where a storage array comprises a plurality of managed drives using equation (1), above.

At block 406, a processor or processor at the UEM platform information handling system executes code instructions of the predictive hash table and CO2 minimizing system in an embodiment to train a time series forecasting engine to predict a memory size for storage of a fingerprint hash table generated, at least in part, due to the predicted volume of deduplication processes. For example, the time series forecasting engine 286 in an embodiment may also use the training period operational telemetry measurements received at block 402, including data content deduplication telemetry, to execute code instructions of an algorithm to model a relationship between a size of the fingerprint hash table 218 generated during previous time windows to a size of the fingerprint hash table 218 to be generated during an upcoming or current time window. This may be performed for each computing node (e.g., 240a or 240b) using equation (2) above.

A processor or processor executing the code instructions of the predictive hash table and CO2 minimizing system in an embodiment at block 408 may receive monitoring period operational telemetry including updated information of the same type identified within the training period operational telemetry. Following training of the time series forecasting engine 286 in such a way, a processor executing code instructions of the deduplication agent 216 at a data center 210 may begin gathering, recording, and transmitting monitoring period operational telemetry measurements, including the data content deduplication telemetry, similar to those gathered, recorded, and transmitted to the predictive hash table and CO2 minimizing system 280 during the training period.

At block 410, a processor or processor executing the code instructions of the predictive hash table and CO2 minimizing system in an embodiment may predict the volume of deduplication actions and the size of the fingerprint hash table expected to be generated during a future time window for a data center. For example, executing the trained time series forecasting engine 286 at the UEM platform information handling system may use the monitoring period operational telemetry measurements including data content deduplication telemetry received at block 408 to predict a volume of deduplication processes that are expected to occur during a future time window, based on the volume of deduplication processes previously executed within the data storage system/data center 210. These predicted future volumes of deduplication processes may be used to instruct the deduplication engine 283 to later predict an optimal amount of memory to reserve for storage of a resulting fingerprint hash table in an embodiment, as described in greater detail below with respect to FIG. 5. The method for training and using a time series forecasting engine for predicting a future workload of deduplication processes may then end.

Figure 5:
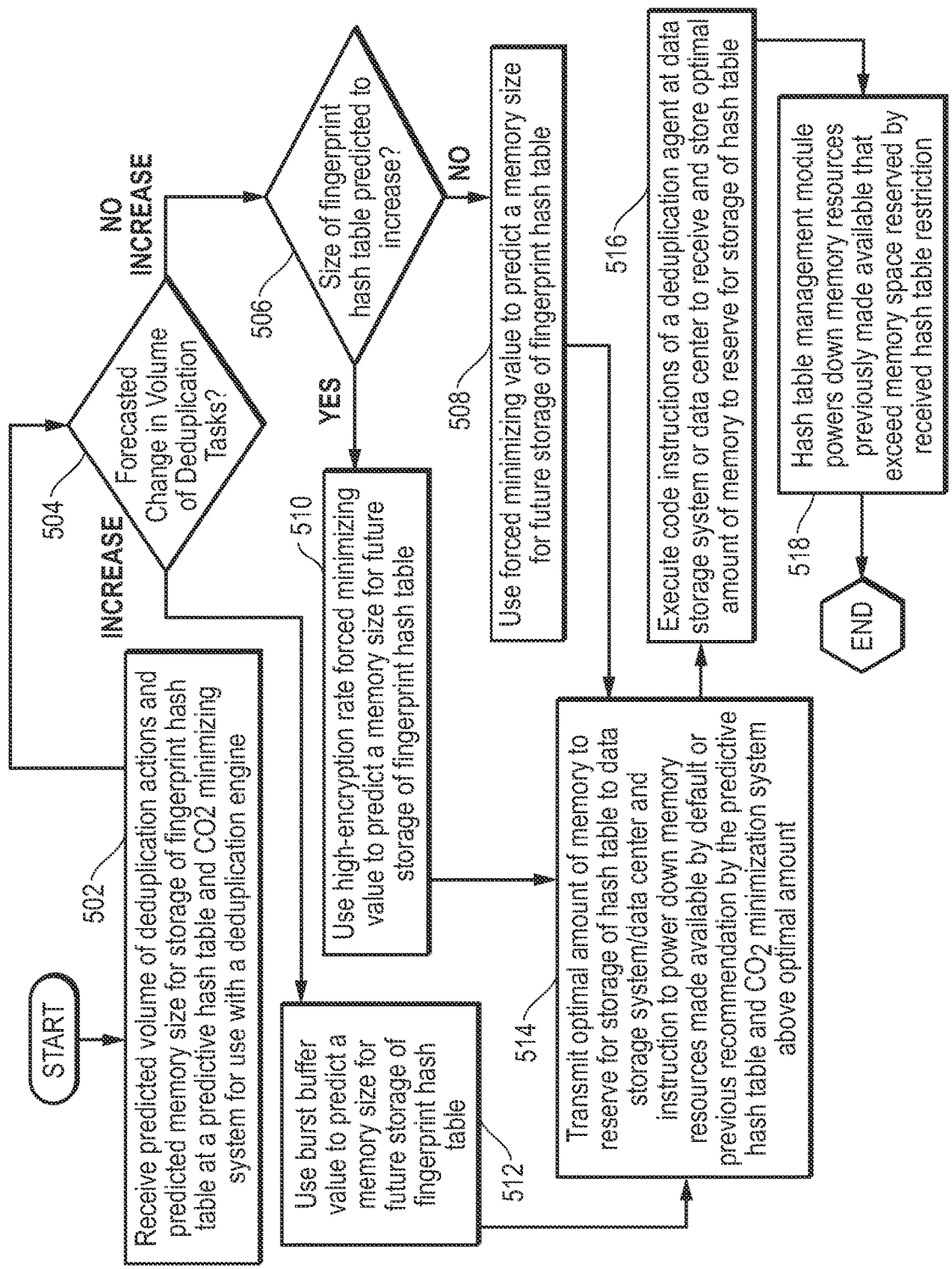
FIG. 5 is a flow diagram illustrating a method of decreasing power consumption of memory hardware components unnecessarily reserved for storage of a fingerprint hash table during an upcoming time window according to an embodiment of the present disclosure.

FIG. 5 is a flow diagram illustrating a method of decreasing carbon dioxide (CO2) emitted due to power consumption of memory hardware components within a data center unnecessarily reserved and powered on for storage of a fingerprint hash table predicted to be generated during an upcoming time window according to an embodiment of the present disclosure. As described herein, a processor executing code instructions of the predictive hash table and CO2 minimizing system at a Unified Endpoint Management (UEM) platform information handling system in connection with a deduplication agent executing at a data storage system/data center in an embodiment may determine an optimal amount of memory to reserve for storage of a future fingerprint hash table, based on predicted future volume of deduplication processes and future fingerprint hash table size, as well as user input restrictions indicating a level of user confidence in the accuracy of these predictions.

At block 502, a processor or processor executing the code instructions of the predictive hash table and CO2 minimizing system may receive from the time series forecasting engine a predicted volume of deduplication processes and predicted memory size for storage of a fingerprint hash table in an embodiment. For example, in an embodiment described with reference to FIG. 2, following prediction of a future workload of deduplication processes (e.g., $Y_t$ defined according to equation (1) above), and a predicted size of the fingerprint hash table 218 to be generated during a future time window (e.g., $Z_t$ defined according to equation (2) above), the time series forecasting engine 286 may transmit these predicted values (e.g., YA, and Zi) to the deduplication engine 283 for determination of an optimal amount of memory to reserve for storage of the fingerprint hash table 218 to be generated during the upcoming time window.

The processor or processor executing the code instructions of the deduplication engine of the predictive hash table and CO2 minimizing system in an embodiment may determine at block 504 whether the volume of deduplication processes is predicted to increase during the upcoming time window. As described herein, the predicted change in the volume of deduplication processes (e.g., increasing, decreasing, or remaining static in comparison to the most recent time window) may influence the type of user-defined restrictions applied to determine an optimal amount of memory to reserve for storage of an upcoming time window. For example, if the volume of deduplication tasks is predicted to increase, this may indicate a likelihood of a related increase in the number of entries within, and the total size of the fingerprint hash table generated during that time window, and the method may proceed to block 512. As another example, if the volume of deduplication tasks is not predicted to increase, the fingerprint hash table size may also remain steady, or decrease in relation to the predicted volume of deduplication tasks. However, the fingerprint hash table size may increase, despite the lack of increase in deduplication workload if a high volume of encryption tasks are performed, because this unnecessarily increases the size of the fingerprint hash table. Thus, the method may proceed to block 506 to determine whether the fingerprint hash table is predicted to increase or decrease.

At block 506, in an embodiment in which the volume of deduplication tasks is expected to increase, the execution of code instructions of the deduplication engine at the UEM platform information handling system may determine whether the size of the fingerprint hash table is predicted to increase. In some cases, the volume of deduplication processes $Y_t$ to be executed in a future time window is not predicted to increase, and the size of the fingerprint hash table $Z_t$ is also not predicted to increase. This may be the case when most or all entries of the fingerprint hash table 218 during the upcoming time window are likely to be the result of deduplication processes executed on non-encrypted data tracks/records. In that case, as the number of deduplication processes $Y_t$ decreases, so too would the number of entries and overall size $Z_t$ of the fingerprint hash table 218, and the method may proceed to block 508 for use of the user-defined forced minimizing value to predict the memory size for future storage of the fingerprint hash table.

In other cases, the volume of deduplication processes $Y_t$ to be executed in a future time window is not predicted to increase, but the size of the fingerprint hash table $Z_t$ is expected to increase. This may be the case when some number of entries in the hash table 218 during the upcoming time window are expected to result from storage of encrypted data tracks/records within the data storage system/data center 210. An increase in encryption tasks may increase the size of the fingerprint hash table 218 because each encrypted data record receives an entry in the hash table, but cannot be deduplicated, as described herein. Thus, as the volume of encryption tasks increases, the size of the hash table $Z_t$ may increase, despite no growth in the volume of deduplication processes Yr. As a consequence, the method may proceed to block 510 in that case, to use a high-encryption rate forced minimizing value to predict a memory size for the future storage of the fingerprint hash table.

At block 508, in an embodiment in which the volume of deduplication tasks is not predicted to increase, and the size of the fingerprint hash table is also not predicted to increase, the execution of code instructions of the deduplication engine at the UEM platform information handling system may use a user-defined forced minimizing value to predict a memory size for the future storage of fingerprint hash values. As described herein, the predicted size of the fingerprint hash table 218 in an embodiment may differ from the amount of memory that is optimally reserved for storage of the fingerprint hash table 218. For example, the manager of the data storage system/data center 210 may wish to reserve more or less memory space than the expected size of the fingerprint hash table 218 in order to account for the level of confidence of a manager based on various factors in the predicted size of the hash table 218, or an expected burst in write commands not anticipated by the time series forecasting engine 286.

More specifically, the processor or processors executing the code instructions of the deduplication engine 283 or the predictive hash table and CO2 minimizing system 280 may determine an optimal amount of memory to reserve for storage of a fingerprint hash table 218 generated during the upcoming time window using a forced minimizing value s to cap the amount of memory reserved for storage of the hash table 218. The deduplication engine 283 may use this user-defined forced minimizing value s, the predicted size of the fingerprint hash table 218 to be generated during the next time window $Z_t$, as received from the time series forecasting engine 286, and equation (5) above to determine an anticipated decreasing growth rate $G_{DEC}$ for the fingerprint hash table 218 that would be allowable by the user (e.g., as based on user-defined forced minimizing value s). Because this equation is used when the size of the fingerprint hash table is predicted to decrease, such that $Z_t-Z_{t-1}$ is a negative value, the decreasing growth rate $G_{DEC}$ may also have a negative value. In such an embodiment, execution of the deduplication engine 263 may then use a code algorithm expression of equation (6) to determine an optimal amount of memory to reserve for storage of the fingerprint hash table 218 during the upcoming time window, based on the decreased growth rate $G_{DEC}$ determined using equation (5) above. In such a way, the execution of predictive hash table and CO2 minimizing system 280 at the UEM platform information handling system 200 in an embodiment may predict an optimal amount of memory to reserve for storage of a hash table 218 to be stored in an upcoming time window. The method may then proceed to block 514 for transmission of the predicted optimal amount of memory to reserve for storage of the hash table to the data center.

At block 510, in an embodiment in which the volume of deduplication tasks is not predicted to increase, but the size of the fingerprint hash table is predicted to increase, execution of the deduplication engine may use a user-defined high-encryption rate forced minimizing value to predict a memory size for the future storage of the fingerprint hash table. For example, execution of code instructions of the time series forecasting engine 286 may predict no growth in the volume of deduplication processes $Y_t$ to be executed during an upcoming time window using a code algorithm expression of equation (1) above, and an increase in the size $Z_t$ of the fingerprint hash table 218 using a code algorithm expression of equation (2) above. Execution of these code algorithms may indicate that the increase in the size of the fingerprint hash table $Z_t$ may occur due to a high volume of encryption tasks, despite a lack of need to record such encrypted tracks within the fingerprint hash table. In such an embodiment, code execution of the deduplication engine 283 of the predictive hash table and CO2 minimizing system may use a high-encryption rate forced minimizing value p associated with an anticipated burst in encryption tasks during an upcoming window to determine an optimal amount of memory to reserve for storage of the fingerprint hash table. In other words, it may be optimal to forcibly cap the size of memory made available for the fingerprint hash table storage as a way to avoid unnecessary entries within the fingerprint hash table 218 associated with the encrypted tracks. The method may then proceed to block 514 for transmission of the predicted optimal amount of memory to reserve for storage of the hash table as an instruction to the data center.

Code execution of the deduplication engine 283 may use this user-defined high-encryption rate forced minimizing value p, the predicted size of the fingerprint hash table 218 to be generated during the next time window $Z_t$, as received from the time series forecasting engine 286, and the code algorithm expression of equation (7) to determine an anticipated encryption-capped growth rate GE-CAP for the fingerprint hash table 218 that would be allowable by the user (e.g., as based on user-defined high encryption rate forced minimizing value p). In such an embodiment, code execution of the deduplication engine 263 may then use a code algorithm expression of equation (8) to determine an optimal amount of memory to reserve for storage of the fingerprint hash table 218 during the upcoming time window, based on the encryption-capped growth rate GE-CAP determined using a code algorithm expression of equation (7) above. In such a way, execution of code instructions of the predictive hash table and CO2 minimizing system 280 at the UEM platform information handling system 200 in an embodiment may predict an optimal amount of memory to reserve for storage of a hash table 218 to be stored in an upcoming time window.

At block 512, in an embodiment in which the volume of deduplication tasks is predicted to increase, code execution of the deduplication engine may use a user-defined burst buffer value to predict a memory size for the future storage of fingerprint hash values. For example, execution of code instructions of the time series forecasting engine 286 may predict a future workload of deduplication processes to be executed during an upcoming time window that is greater than the most recently recorded volume of deduplication processes executed. In such an embodiment, code execution of the deduplication engine 283 of the predictive hash table and CO2 minimizing system 280 may determine an optimal amount of memory to reserve for storage of a fingerprint hash table 218 generated during the upcoming time window based on a user-defined burst buffer value r. As described above, the user-defined burst buffer value r may provide a buffer of extra storage space to accommodate a manager's confidence in the ability of the predictive hash table and CO2 minimizing system 280 to accurately predict the size of the fingerprint hash table 218 generated during an upcoming time window. The code execution of deduplication engine 283 may use this user-defined burst buffer value r, the predicted size of the fingerprint hash table 218 to be generated during the next time window $Z_t$ as received from the time series forecasting engine 286, and a code algorithm expression of equation (3) to determine an anticipated increasing growth rate $G_{INC}$ for the fingerprint hash table 218 that would be allowable by the user (e.g., as based on user-defined burst buffer value r). In such an embodiment, the deduplication engine 263 may then use a code algorithm expression of equation (4) to determine an optimal amount of memory to reserve for storage of the fingerprint hash table 218 during the upcoming time window, based on the increased growth rate $G_{INC}$ determined using a code algorithm expression of equation (3) above. In such a way, execution of code instructions of the predictive hash table and CO2 minimizing system 280 at the UEM platform information handling system 200 in an embodiment may predict an optimal amount of memory to reserve for storage of a hash table 218 to be stored in an upcoming time window. The method may then proceed to block 514 for transmission of the predicted optimal amount of memory to reserve for storage of the hash table as an instruction to the data center.

The predictive hash table and CO2 minimizing system in an embodiment at block 514 may transmit the optimal amount of memory to reserve for storage of the fingerprint hash table as an instruction to the data storage system/data center, as determined at block 508, 510, or 512 above. For example, upon determining an optimal amount of memory that should be reserved for storage of the fingerprint hash table(s) (e.g., 218) in an embodiment according to a code algorithm expressions of equations (4), (6), or (8), the deduplication engine 283 may transmit this value to the deduplication agent 216 for implementation of the instruction at the data storage system/data center 210. In each of the above described embodiments, the predictive hash table and CO2 minimizing system 280 may also transmit to the deduplication agent 216 an instruction to power down or turn off any memory resources previously reserved for storage of the fingerprint hash table 218 that exceed the optimal amount of memory reserved for storage of the fingerprint hash table 218 for the upcoming time window. In such a way, the predictive hash table and CO2 minimizing system 280 may instruct the deduplication agent 216 of the data storage system/data center 210 execute code instructions to decrease unnecessary power consumption by memory hardware components (e.g., 243a, 243b, 211, 250a, 250b, 251, 252, 253, 254) due to powering on memory unnecessarily reserved for storage of the fingerprint hash table(s) 218).

At block 516, a processor executing code instructions of the deduplication agent at the data storage system or data center may receive and store the optimal amount of memory to reserve for storage of the hash table in an embodiment. For example, in an embodiment described with reference to FIG. 3, the predictive hash table and CO2 minimizing system 380 operating at the unified endpoint management (UEM) platform 300 in an embodiment may transmit to the deduplication agent 316 of a data storage system/data center 310 an instruction with a recommended optimal amount of memory to reserve (and power on) for storage of a fingerprint hash table 318 predicted to be generated by computing nodes of the data storage system/data center 310 during an upcoming time window. Upon receipt of the recommended optimal amount of memory to reserve (and power on) for storage of a fingerprint hash table 318 in an upcoming time window at the deduplication agent 316 in an embodiment, the deduplication agent 316 may store this value within the hash table restrictions 305.

The processor executing code instructions of the deduplication agent at the data storage system or data center in an embodiment at block 518 may power down the memory resources previously made available that exceed the optimal amount of memory for storage of the fingerprint hash table received at block 514. For example, the predictive hash table and CO2 minimizing system 380 in an embodiment may transmit to the deduplication agent 316 an instruction to power down any memory hardware components of the data storage system/data center 310 previously reserved for storage of a fingerprint hash table 318 that exceeds the optimal amount of memory recommended by the predictive hash table and CO2 minimizing system 380. The hash table management module 303 in such an embodiment may then instruct the hash generator 301 to stop generating new entries to the hash table 318 during that time window once the hash table 318 has reached a size equivalent to the recommended optimal amount of memory stored at 305. In such a way, the deduplication agent 316 in an embodiment may tailor the size of the hash table 318 to meet the optimal amount of memory reserved for storage of the hash table 318, as determined by the predictive hash table and CO2 minimizing system 380 in an embodiment. Further, a deduplication engine of the predictive hash table and CO2 minimizing system in an embodiment may thus determine an optimal amount of memory to reserve for storage of a future fingerprint hash table, based on predicted future volume of deduplication processes and future fingerprint hash table size, as well as user input restrictions indicating a level of user confidence in the accuracy of these predictions. The method for decreasing CO2 emitted due to power consumption of memory hardware components within a data center unnecessarily reserved and powered on for storage of a fingerprint hash table predicted to be generated during an upcoming time window may then end.

The blocks of the flow diagrams of FIGS. 4 and 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system executing a predictive hash table and carbon dioxide (CO2) minimizing system comprising:
    a network interface device to receive data content deduplication telemetry measurements from a remote data center, including deduplication process workload metrics, fingerprint hash table size metrics, user-defined hash table size restriction threshold values, and a current reserved memory size allocated for storage of a fingerprint hash table;
    a hardware processor executing code instructions of the predictive hash table and CO2 minimizing system to predict a future workload of deduplication processes for one or more remote data center processors and a future fingerprint hash table size within a future time window;
    the hardware processor executing code instructions to determine a predicted amount of memory to reserve during the future time window for storage of a future fingerprint hash table based on the predicted future workload of deduplication processes and the predicted future fingerprint hash table size;
    the hardware processor executing code instructions to determine an over-allocated portion of the current reserved memory size that exceeds the optimal amount of memory to reserve during the future time window; and
    the network interface device to transmit a memory restriction instruction to limit power provided to the over-allocated portion of the current reserved memory size.

2. The information handling system of claim 1, wherein the current reserved memory size is a simple operating system (SOS) volume table of contents (VTOC) based recommended default hash table memory size.

3. The information handling system of claim 1, wherein the current reserved memory size is a previously-predicted fingerprint hash table memory size determined by the predictive hash table and CO2 minimizing system.

4. The information handling system of claim 1 further comprising:
    the hardware processor executing code instructions to predict the future workload of deduplication processes for one or more remote data center processors within the future time window, based on past volumes of stored data deduplication operations for the one or more remote data center processors within previously received data content deduplication telemetry measurements.

5. The information handling system of claim 1 further comprising:
    the hardware processor executing code instructions to predict the future fingerprint hash table size within the future time window based on sizes of previously stored fingerprint hash tables within previously received data content deduplication telemetry measurements.

6. The information handling system of claim 1 further comprising:
    the hardware processor executing code instructions to determine that the predicted future workload of deduplication processes is greater than a most recently recorded deduplication process workload; and
    the hardware processor executing code instructions to determine the predicted amount of memory to reserve during the future time window for storage of the future fingerprint hash table based on a user-defined burst buffer value.

7. The information handling system of claim 1 further comprising:
    the hardware processor executing code instructions to determine that the predicted future workload of deduplication processes is not greater than a most recently recorded deduplication process workload; and
    the hardware processor executing code instructions to determine the predicted amount of memory to reserve during the future time window for storage of the future fingerprint hash table is to be limited based on a user-defined forced minimizing value.

8. A method of minimizing power consumed and CO2 emitted due to overall location of memory resources of a data storage system for storage of a fingerprint hash table comprising:
    receiving, via a network interface device, data content deduplication telemetry measurements from a remote data storage system, including deduplication process workload metrics, fingerprint hash table size metrics, user-defined hash table size restriction threshold values, and a current reserved memory size allocated for storage of a fingerprint hash table at the remote data storage system;
    predicting, via a hardware processor executing code instructions, a future workload of deduplication processes for one or more remote data storage system processors and a future fingerprint hash table size within a future time window;

determining, via the hardware processor executing code instructions, a predicted amount of memory to reserve during the future time window for storage of a future fingerprint hash table based on the predicted future workload of deduplication processes and the predicted future fingerprint hash table size;

determining, via the hardware processor executing code instructions, an over-allocated portion of the current reserved memory size that exceeds the optimal amount of memory to reserve during the future time window; and transmitting, via the network interface device, a memory restriction instruction to the remote data storage system to limit power provided to the over-allocated portion of the current reserved memory size within the data storage system.

9. The method of claim 8, wherein the current reserved memory size is a simple operating system (SOS) volume table of contents (VTOC) based recommended default hash table memory size.

10. The method of claim 8, wherein the current reserved memory size is a previously-predicted fingerprint hash table memory size.

11. The method of claim 8 further comprising:

predicting, via the hardware processor executing code instructions, the future workload of deduplication processes for one or more remote data storage system processors within the future time window, based on past volumes of stored data deduplication operations for the one or more remote data storage system processors within previously received data content deduplication telemetry measurements.

12. The method of claim 8 further comprising:

predicting, via the hardware processor executing code instructions, the future fingerprint hash table size within the future time window based on sizes of previously stored fingerprint hash tables within previously-received data content deduplication telemetry measurements.

13. The method of claim 8 further comprising:

determining, via the hardware processor executing code instructions, that the predicted future workload of deduplication processes is greater than a most-recently recorded deduplication process workload; and determining, via the hardware processor executing code instructions, the predicted amount of memory to reserve during the future time window for storage of the future fingerprint hash table based on a user-defined burst buffer value.

14. The method of claim 8 further comprising:

determining, via the hardware processor executing code instructions, that the predicted future workload of deduplication processes is not greater than a most recently recorded deduplication process workload; and determining, via the hardware processor executing code instructions, the optimal amount of memory to reserve during the future time window for storage of the future fingerprint hash table is to be limited above a minimum reserved memory amount based on a user-defined forced minimizing value.

15. An information handling system executing a predictive hash table and carbon dioxide ($CO_2$) minimizing system comprising:

a network interface device to receive data content deduplication telemetry measurements from a remote data center, including deduplication process workload metrics, fingerprint hash table size metrics, user-defined hash table size restriction threshold values, and a current reserved memory size allocated for storage of a fingerprint hash table;

a hardware processor executing code instructions of the predictive hash table and $CO_2$ minimizing system to predict a future workload of deduplication processes for one or more remote data center processors, and a future fingerprint hash table size within a future time window;

the hardware processor executing code instructions to determine a predicted amount of memory to reserve during the future time window for storage of a future fingerprint hash table based on the predicted future workload of deduplication processes and the predicted future fingerprint hash table size; and the network interface device to transmit a memory restriction instruction to limit power provided to memory serving as an over-allocated portion of the current reserved memory size that is greater than the predicted amount of memory to reserve during the future time window.

16. The information handling system of claim 15 further comprising:

the hardware processor executing code instructions to determine that the predicted future fingerprint hash table size in the future time window is greater than a most-recently recorded fingerprint hash table size; and the hardware processor executing code instructions to determine the predicted amount of memory to reserve during the future time window for storage of the future fingerprint hash table is bounded based on a user-defined high-encryption rate forced minimizing value.

17. The information handling system of claim 15 further comprising:

the hardware processor executing code instructions to determine that the predicted future fingerprint hash table size in the future time window is not greater than a most-recently recorded fingerprint hash table size; and the hardware processor executing code instructions to determine the predicted amount of memory to reserve during the future time window for storage of the future fingerprint hash table is bounded based on a user-defined forced minimizing value.

18. The information handling system of claim 1, wherein the current reserved memory size is a simple operating system (SOS) volume table of contents (VTOC) based recommended default hash table memory size.

19. The information handling system of claim 1, wherein the current reserved memory size is a previously-predicted fingerprint hash table memory size determined by the predictive hash table and $CO_2$ minimizing system.

20. The information handling system of claim 1 further comprising:

the hardware processor executing code instructions to predict the future fingerprint hash table size within the future time window based on sizes of previously stored fingerprint hash tables within previously received data content deduplication telemetry measurements.

* * * * *